US011632694B2

(12) United States Patent
Zhu et al.

(10) Patent No.: US 11,632,694 B2
(45) Date of Patent: Apr. 18, 2023

(54) NETWORK SLICE AVAILABILITY CHECK AND INDICATION

(71) Applicant: QUALCOMM INCORPORATED, San Diego, CA (US)

(72) Inventors: Xipeng Zhu, San Diego, CA (US); Gavin Bernard Horn, La Jolla, CA (US); Miguel Griot, La Jolla, CA (US); Haris Zisimopoulos, London (GB); Stefano Faccin, San Ysidro, CA (US)

(73) Assignee: QUALCOMM Incorporated, San Diego, CA (US)

( * ) Notice: Subject to any disclaimer, the term of this patent is extended or adjusted under 35 U.S.C. 154(b) by 211 days.

(21) Appl. No.: 16/925,486

(22) Filed: Jul. 10, 2020

(65) Prior Publication Data

US 2021/0037426 A1 Feb. 4, 2021

(30) Foreign Application Priority Data

Jul. 31, 2019 (GR) .............................. 20190100327

(51) Int. Cl.
*H04W 28/16* (2009.01)
*H04W 76/12* (2018.01)
*H04W 60/00* (2009.01)

(52) U.S. Cl.
CPC ........... *H04W 28/16* (2013.01); *H04W 60/00* (2013.01); *H04W 76/12* (2018.02)

(58) Field of Classification Search
CPC ..... H04W 28/16; H04W 76/12; H04W 60/00; H04W 48/18; H04W 72/1284; H04W 72/04; H04W 72/12; H04L 69/167
See application file for complete search history.

(56) References Cited

U.S. PATENT DOCUMENTS

| 2009/0318088 | A1 | 12/2009 | Wu et al. | |
| 2020/0045548 | A1* | 2/2020 | Dowlatkhah | H04N 21/26216 |
| 2021/0185603 | A1* | 6/2021 | Bogineni | H04W 36/32 |
| 2021/0195409 | A1 | 6/2021 | Zhang | |
| 2021/0204349 | A1 | 7/2021 | Jin et al. | |
| 2021/0266999 | A1 | 8/2021 | Laselva et al. | |
| 2021/0368383 | A1* | 11/2021 | Jangid | H04W 28/0289 |

FOREIGN PATENT DOCUMENTS

| CN | 109951877 A | 6/2019 |
| EP | 3709707 A1 | 9/2020 |

OTHER PUBLICATIONS

Ericsson: "Correction to UE Radio Capability handling", 3GPP Draft S2-186163, Jun. 10, 2018 (Jun. 10, 2018).

(Continued)

*Primary Examiner* — Anez C Ebrahim
(74) *Attorney, Agent, or Firm* — Haynes and Boone, LLP

(57) ABSTRACT

Wireless communications systems and methods related to on-demand communications are provided. A first network entity receives, from a user equipment (UE), a network slice request. The first network entity transmits to a second network entity, a request for capability information associated with the UE based on the UE's network slice request. Additionally, the first network entity receives from the second networking entity, a response indicating the capability information associated with the UE.

28 Claims, 13 Drawing Sheets

(56) References Cited

OTHER PUBLICATIONS

LG Electronics: "Resolving Slice Coexistence issue", 3GPP Draft C1-180260, Jan. 15, 2018 (Jan. 15, 2018).
Qualcomm Incorporated: "KI #7, New Sol: Compatibility of S-NS-SAIs operating frequency bands with UE Radio Capabilities", 3GPP Draft S2-2003793, May 22, 2020 (May 22, 2020).
International Search Report and Written Opinion issued in PCT/US2020/041850 dated Oct. 2, 2020.

\* cited by examiner

NETWORK SLICE AVAILABILITY CHECK AND INDICATION

CROSS REFERENCE TO RELATED APPLICATIONS & PRIORITY CLAIM

The present application claims priority to and the benefit of the Greek Provisional Patent Application No. 20190100327 filed Jul. 31, 2019, which is hereby incorporated by reference in its entirety as if fully set forth below and for all applicable purposes.

TECHNICAL FIELD

This application relates to wireless communication systems, and more particularly to indication and availability of a network slice.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long-term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

The improved latency, reliability, bandwidth, and/or throughput in NR enable various types of network deployments and/or services such as enhanced mobile broadband (eMBB), ultra-reliable, low-latency communication (URLLC), and/or Internet of Things (IoT) services. The different types of services may have different traffic requirements (e.g., latency, bandwidth, reliability, and/or throughput).

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes receiving, by a core network entity from a user equipment (UE), a network slice request; transmitting, by the core network entity to a first base station (BS), a request for capability information associated with the UE based on the UE's network slice request; and receiving, by the core network entity from the first BS, a response indicating the capability information associated with the UE.

In an additional aspect of the disclosure, an apparatus includes a transceiver configured to receive, from a UE, a network slice request; transmit, to a first BS, a request for capability information associated with the UE based on the UE's network slice request; and receive, from the first BS, a response indicating the capability information associated with the UE.

In an additional aspect of the disclosure, a computer-readable medium having program code recorded thereon, the program code includes code for causing a core network entity to receive from a UE, a network slice request; code for causing the core network entity to transmit to a BS, a request for capability information associated with the UE based on the UE's network slice request; and code for causing the core network entity to receive from the BS, a response indicating the capability information associated with the UE.

In an additional aspect of the disclosure, an apparatus includes means for receiving from a UE, a network slice request; means for transmitting to a BS, a request for capability information associated with the UE based on the UE's network slice request; and means for receiving from the BS, a response indicating the capability information associated with the UE.

In an additional aspect of the disclosure, a method of wireless communication includes receiving, by a BS from a UE, a network slice request; receiving, by the BS from a core network entity, a request for capability information associated with the UE based on the UE's network slice request; and transmitting, by the BS to the core network entity, a response indicating the capability information associated with the UE.

In an additional aspect of the disclosure, an apparatus includes a transceiver configured to receive, from a UE, a network slice request; receive, from a core network entity, a request for capability information associated with the UE based on the UE's network slice request; and transmit, to the core network entity, a response indicating the capability information associated with the UE.

In an additional aspect of the disclosure, a computer-readable medium having program code recorded thereon, the program code includes code for causing a BS to receive from a UE, a network slice request; code for causing the BS to receive from a core network entity, a request for capability information associated with the UE based on the UE's network slice request; and code for causing the BS to transmit to the core network entity, a response indicating the capability information associated with the UE.

In an additional aspect of the disclosure, an apparatus includes means for receiving from a UE, a network slice request; means for receiving from a core network entity, a request for capability information associated with the UE based on the UE's network slice request; and means for transmitting to the core network entity, a response indicating the capability information associated with the UE.

In an additional aspect of the disclosure, a method of wireless communication includes transmitting, by a UE, a request for a network slice of a network; and receiving, by the UE, a response indicating a rejection of the requested network slice and a cause of the rejection.

In an additional aspect of the disclosure, an apparatus includes a transceiver configured to transmit a request for a network slice of a network; and receive a response indicating a rejection of the requested network slice and a cause of the rejection.

In an additional aspect of the disclosure, a computer-readable medium having program code recorded thereon, the program code includes code for causing a UE to transmit a request for a network slice of a network; and code for causing the UE to receive a response indicating a rejection of the requested network slice and a cause of the rejection.

In an additional aspect of the disclosure, an apparatus includes means for transmitting a request for a network slice of a network; and means for receiving a response indicating a rejection of the requested network slice and a cause of the rejection.

In an additional aspect of the disclosure, a method of wireless communication includes transmitting, by a UE, a request for a network slice of a network; and receiving, by the UE, a response indicating the requested network slice is available on-demand by the UE's request, wherein the requested network slice is not supported by a current tracking area associated with the UE.

In an additional aspect of the disclosure, an apparatus includes a transceiver configured to transmit a request for a network slice of a network; and receive a response indicating the requested network slice is available on-demand by the UE's request, wherein the requested network slice is not supported by a current tracking area associated with the UE.

In an additional aspect of the disclosure, a computer-readable medium having program code recorded thereon, the program code includes code for causing a UE to transmit a request for a network slice of a network; and code for causing the UE to receive a response indicating the requested network slice is available on-demand by the UE's request, wherein the requested network slice is not supported by a current tracking area associated with the UE.

In an additional aspect of the disclosure, an apparatus includes means for transmitting a request for a network slice of a network; and means for receiving a response indicating the requested network slice is available on-demand by the UE's request, wherein the requested network slice is not supported by a current tracking area associated with the UE.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
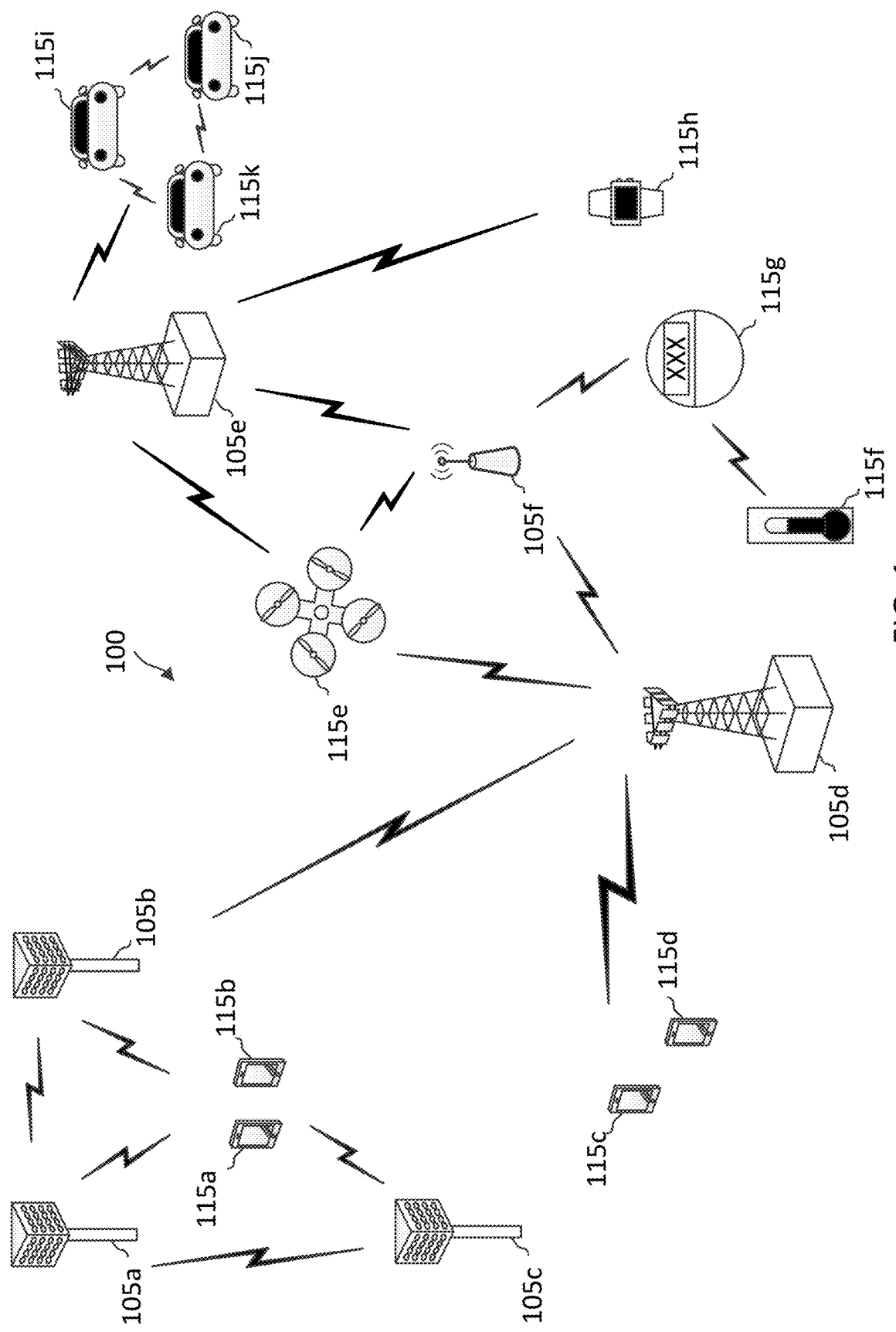
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

NR may employ network slicing to configure multiple network slices to support traffic with different traffic requirements. A network slice generally refers to a logical network that includes a set of network functions and corresponding resources necessary to provide certain network capabilities and network characteristics. A network slice may include functions of an access network (AN) and a core network (CN). A network slice instance (NSI) is an instantiation of a network slice, i.e. a deployed set of network functions delivering the intended network slice services according to a network slice template.

In an example, a network slice comprises control plane and user plane functionality and resources required to fulfill a particular service or set of services and may include: 1) core network control plane and user plane network functions, as well as their resources (in terms of compute, storage and network resources, including transport resources between the network functions); 2) a radio access network; and 3) in the case of a network slice supporting a roaming service, a visitor public land mobile network (VPLMN) part and a home PLMN (HPLMN) part.

In some examples, a UE may be a smartphone that requires multiple services of different traffic requirements. For example, the UE may require enhanced mobile broadband (eMBB) services with a high throughput most of the time, but may require URLLC services during certain time periods. Some examples of applications that may require URLLC services may include extended reality (XR) applications, healthcare applications, and/or intelligent transport system applications. With network slicing, operators may typically deploy one or more network slices with a high throughput over a certain frequency carrier (e.g., F1) for serving eMBB services and one or more network slices with a low-latency over another frequency carrier (e.g., F2) for serving URLLC services. In other words, if a UE is on the frequency carrier F1, the UE may have access to eMBB slices, but no access to URLLC slices. Similarly, if a UE is on the frequency carrier F2, the UE may have access to URLLC slices, but no access to eMBB slices. If the UE is on the frequency carrier F1 and requests URLLC slices, the UE may be unable to access the URLLC slices because they are not supported by the frequency carrier F1. Although the URLLC slices are not supported by the frequency carrier F1, the URLLC slices may be available to the UE on-demand. For example, the network may provide the UE with information on the UE's requested network slices that are not currently supported by the frequency carrier F1, but are supported by another frequency carrier (e.g., frequency carrier F2) upon the UE's request. A network slice that is available to the UE "on-demand" may refer to a network slice that is accessible to the UE if the UE is on the frequency carrier F2 (e.g., by dual-connectivity, carrier aggregation, or handover/redirection to the frequency carrier F2).

The present application describes mechanisms for providing an indication of available network slices that are not supported by a first current tracking area, but are supported by a second tracking area different from the first tracking area. The UE may register its presence in the current tracking area of a cell operating over the frequency carrier F1. A network may implement network slicing to serve services of different requirements over different network slices and/or over different cell frequencies. The network may include a core network and a radio access network (RAN). The RAN (e.g., a BS) may be in communication with the core network that manages the network slices in the network. In an embodiment, a first cell frequency of the network (e.g., in the RAN) may support an eMBB slice, but may not support a URLLC slice. Instead, a second cell frequency of the network (e.g., in the RAN) may support a URLLC slice. A UE is associated with a first cell frequency of a network or a BS operating over the first cell frequency. For example, a UE is associated with a first cell frequency of a network or a BS operating over the first cell frequency. The UE may be interested in a particular network slice of the network that is not allowed or supported by the first cell frequency. The particular network slice may not be within allowed network slice selection assistance information (NS-SAI) of the first cell frequency. The particular network slice may be served over a second cell frequency of the network.

The UE may request the network for the interested network slice over the first cell frequency via non-access stratum (NAS) signaling. The allowed NSSAI may indicate the network slices that are supported by the current tracking area, but may indicate an incomplete set of network slices that the UE may use. If a network slice is not supported by the current tracking area, the network slice may still be available for the UE upon request. For example, if one or more of the requested network slices are not supported by the current tracking area, the network may query next generation (NG)-RAN by using an enhanced UE radio capability check procedure. The current tracking area may refer to the tracking area in which the UE is located and being served by a BS. The enhanced UE radio capability check procedure may allow the network to check whether the UE's requested network slice(s) can be supported by RAN (e.g., by dual-connectivity with the second cell frequency, or a carrier aggregation with the second cell frequency, or handover/redirection to the second cell frequency) when the UE requests. A BS may provide the core network with information associated with the UE's interested network slice and/or information associated with the second cell frequency that provides the UE's interested slice.

In an example, using the enhanced UE radio capability check procedure, the network may determine capability information associated with the UE based on the UE's network slice request and communicate a response indicating the capability information associated with the UE. The response may include allowed NSSAI indicating a first set of slices supported by the current tracking area and include rejected NSSAI indicating a second set of slices that are available on-demand by the UE. In this example, the second set of slices is not supported by the current tracking area, and the response includes a cause value indicating that the second set of slices are available upon the UE's request. The UE may receive a service over the available network slice in the second cell frequency, the available network slice being unsupported by the first cell frequency.

Aspects of the present disclosure can provide several benefits. For example, the enabling of the UE to transmit a request for a particular network slice not included in the allowed NSSAI allows the network to indicate to the UE one or more network slices that are available upon request by the UE. The disclosed embodiments may allow a core network to identify network slices that could be available by dual-connectivity, carrier aggregation, or handover/redirection upon the UE's request. Additionally, the disclosed embodiments may allow RAN to check whether a network slice could be available by dual-connectivity, carrier aggregation, or handover/redirection upon the UE's request. Moreover, the disclosed embodiments may allow a UE to identify network slices that are not supported by the current tracking area, but could be made available on-demand. While the disclosed embodiments are described in the context of eMBB services and URLLC services, the disclosed embodiments may be applied to any suitable types of services.

FIG. 1 illustrates a wireless communication network 100 according to some embodiments of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115k are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as in a vehicle-to-vehicle (V2V).

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In an embodiment, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for DL communication.

In an embodiment, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as a message 1 (MSG 1), a message 2 (MSG 2), a message 3 (MSG 3), and a message 4 (MSG 4), respectively. In some examples, the random access procedure may be a two-step random access procedure, where the UE 115 may transmit a random access preamble and a connection request in a single transmission and the BS 105 may respond by transmitting a random access response and a connection response in a single transmission. The combined random access preamble and connection request in the two-step random access procedure may be referred to as a message A (MSG A). The combined random access response and connection response in the two-step random access procedure may be referred to as a message B (MSG B).

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant. The connection may be referred to as an RRC connection. When the UE 115 is actively exchanging data with the BS 105, the UE 115 is in an RRC connected state.

In an example, after establishing a connection with the BS 105, the UE 115 may initiate an initial network attachment procedure with the network 100. The BS 105 may coordinate with various network entities or fifth generation core (5GC) entities, such as an access and mobility function (AMF), a serving gateway (SGW), and/or a packet data network gateway (PGW), to complete the network attachment procedure. For example, the BS 105 may coordinate with the network entities in the 5GC to identify the UE, authenticate the UE, and/or authorize the UE for sending and/or receiving data in the network 100. In addition, the AMF may assign the UE with a group of tracking areas (TAs). Once the network attach procedure succeeds, a context is established for the UE 115 in the AMF. After a successful attach to the network, the UE 115 can move around the current TA. For tracking area update (TAU), the BS 105 may request the UE 115 to update the network 100 with the UE 115's location periodically. Alternatively, the UE 115 may only report the UE 115's location to the network 100 when entering a new TA. The TAU allows the network 100 to quickly locate the UE 115 and page the UE 115 upon receiving an incoming data packet or call for the UE 115. A registration area may have one or more tracking areas. A tracking area may have one or more cells. Additionally, a tracking area identity (TAI) is an identifier that is used to track tracking areas. The TAI may be constructed from the PLMN identify to which the tracking area belongs and the tracking area code (TAC) of the tracking area.

In an embodiment, the network 100 may operate over a system BW or a component carrier BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some embodiments, a BS 105 may assign a pair of BWPs within the component carrier to a UE 115 for UL and DL communications. For example, the BWP pair may include one BWP for UL communications and one BWP for DL communications.

In an embodiment, the network 100 may be a 5G network. The network 100 may implement network slicing to create multiple isolated virtual networks or independent logical network slices to support a variety of application services in the network 100. The network 100 may configure each network slice according to the specific needs of the services being served. In an embodiment, the network 100 may configure a network slice with a high throughput for serving eMBB services and configure another network slice with a low latency and high reliability for serving URLLC services. The network 100 may configure network slices with different traffic requirements over different frequency carriers. For example, the network 100 may configure different frequency carriers with different communication configurations. The network 100 may configure a frequency carrier F1 with a communication configuration that can provide a high throughput and another frequency carrier F2 with a communication configuration that can provide a low latency. The network 100 may configure one or more network slices in the frequency carrier F1 for serving eMBB services. The network 100 may configure one or more network slices in the frequency carrier F2 for serving URLLC services.

A UE 115 may request for a particular network slice (e.g., an eMBB slice or an URLLC slice) in a network registration request message to the core network. The network slice request may indicate a first set of network slices supported by a current tracking area associated with a BS and indicate a second set of network slices not supported by the current tracking area. The core network and the BS may communicate with each other to determine a subset of the second set of network slices that are supported by another tracking area. The core network may transmit a response to the network slice request, the response indicating the subset of network slices that are available to the UE on-demand. Mechanisms for determining the availability of network slices for the UE to request services on demand and indicating the available network slices, where the network services are not supported by the current tracking area, are described in greater detail herein.

Figure 2:
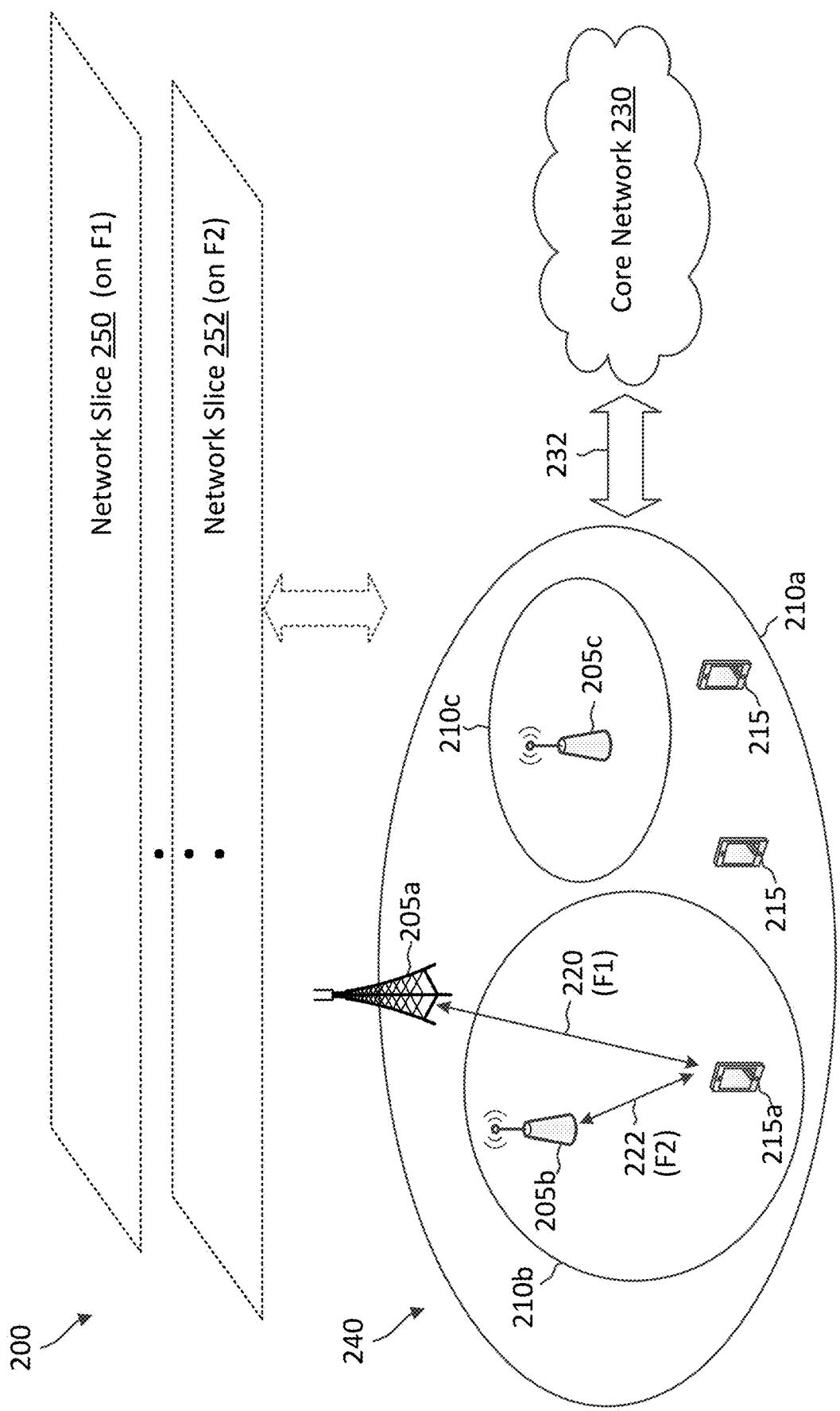
FIG. 2 illustrates a wireless communication network system that implements network slicing according to some embodiments of the present disclosure.

FIG. 2 illustrates a wireless communication network 200 that implements network slicing according to some embodiments of the present disclosure. The network 200 may correspond to a portion of the network 100. The network 200 may be a 5G network. The network 200 includes a radio access network (RAN) 240 in communication with a core network 230 via backhaul links 232. For simplicity of illustration and discussion, FIG. 2 illustrates three BSs 205a, 205b, and 205c and three UEs 215 in the RAN 240. However, the RAN 240 may be scaled to include any suitable number of BSs (e.g., about 2, 4, 5, or more) and/or any suitable number of UEs (e.g., up to millions). The BSs 205 are similar to the BSs 105. The UEs 115 are similar to the UEs 115.

In the network 200, the BS 205a may serve UEs 215 over a frequency carrier 220 (shown as F1) in an area 210a, the BS 205b may serve UEs 215 over another frequency carrier 222 (shown as F2) in an area 210b, and the BS 205c may serve UEs 215 over the frequency carrier 222 in an area 210c. The frequency carrier 220 and the frequency carrier 222 may be at any suitable frequency. In some examples, the frequency carrier 220 and the frequency carrier 222 can be at sub-6 gigahertz (GHz) bands. In some examples, the frequency carrier 220 and the frequency carrier 222 can be at mmWave bands. In some examples, one of the frequency carriers 220 and 222 can be at a sub-6 GHz band and the other frequency carriers 220 and 222 can be at a mmWave band.

In an example, the UEs 215 may be a smart phone requiring eMBB services and may additionally require URLLC services. In an example, the UE 215a may include an extended reality (XR) application and may require an URLLC service for communicating XR application data. In an example, the UE 215a may be a remote diagnostic device with sensors that requires an URLLC service for communicating health monitoring information. In an example, the UE 215a may be associated with an intelligent transportation system that requires an URLLC service for communicating transport information. In some examples, the UE 215a may require an eMBB service and URLLC services at the same time.

In an example, the core network 230 is a 5G core network and may provide network functions such as an authentication server function (AUSF), an AMF, a session management function (SMF), a policy control function (PCF), a user plane function (UPF), an application functions (AFs), a unified data repository (UDR), an unstructured data storage network function (UDSF), a network exposure function (NEF), an NF repository function (NRF), a unified data management function (UDM), and/or a network slice selection function (NSSF). The BSs 205 may coordinate with the core network 230 in serving the UEs 215.

In an example, the network 200 may implement network slicing to provision for the eMBB services and the URLLC services. For example, the network 200 may configure one or more network slices 250 over the frequency carrier F1 220 and one or more network slices 252 over the frequency carrier F2 222. Each of the network slices 250 and 252 may function as a logical network and may implement AN and CN functionalities as described above. In an example, all the network slices 250 may serve one type of service (e.g., eMBB services or URLLC services). In an example, at least one network slice 250 may serve a different type of service than the other network slices 250. Similarly, in an example, all the network slices 252 may serve one type of service (e.g., eMBB services or URLLC services). In an example, at least one network slice 252 may serve a different type of service than the other network slices 252.

In an example, the network slices 250 over the frequency carrier F1 220 may serve one or more types of services and the network slices 252 over the frequency carrier F2 220 may serve one or more types of services, but at least one type of service is served over by one of the network slices 250 and one of the network slices 252. For example, all network slices 250 may serve MBB services, at least one network slice 252 may serve URLLC services, and at least one network slice 252 may serve eMBB services. Alternatively, at least one network slice 250 may serve MBB services, at least one network slice 250 may serve voice services, at least one network slice 252 may serve URLLC services, and at least one network slice 252 may serve eMBB services.

In an example, the network slices 250 and the network slices 252 may serve different types of services. For example, the network slices 250 over the frequency carrier 220 may serve eMBB services, but may not serve URLLC services, whereas the network slices 252 over the frequency carrier 222 may serve URLLC services, but may not serve eMBB services.

In some examples, the frequency carrier 220 may be at about 2.6 GHz and may be shared with a LTE TDD network, whereas the frequency carrier 222 may be at about 4.9 GHz which may not be shared with a LTE TDD network. Due to the sharing with the LTE TDD network on the 2.6 GHz carrier, communications over the 2.6 GHz carrier may have various restrictions. For example, UL-to-DL and/or DL-to-UL switching time for communication over the 2.6 GHz carrier is required to align to the UL-to-DL and/or DL-to-UL switching time of the LTE TDD network. Thus, some operators may deploy eMBB slices, but not URLLC slices over the 2.6 GHz carrier. Instead, the operators may deploy URLLC slices over the less restrictive 4.9 GHz carrier.

In some instances, while the UE 215a is served by the BS 205a over the frequency carrier 220 for an eMBB service in a network slice 250, the UE 215a may launch an application requiring an URLLC service. Thus, the network 200 is required to direct the UE 215a to the frequency carrier 222 so that the UE 215a may receive the URLLC service in a network slice 252. However, the UE 215a may not have knowledge about which frequency carrier or cell in the network 200 may provide a network slice that can support an URLLC service. The UE 215a also may not have knowledge about whether a network slice could be available by dual-connectivity, carrier aggregation, or handover/redirection upon the UE's request. For dual-connectivity, the UE may continue to be served by the BS 205a over the frequency carrier 220 and additionally served by a second BS over the frequency carrier 222. For carrier aggregation, the UE may continue to be served by the BS 205a over the frequency carrier 220 and additionally served by the BS 205a over the frequency carrier 222.

Additionally, a BS 205 may be aware of the active network slice used by a UE 215 and of which network slice is available or allowed in which frequency carrier (e.g., neighboring cell) over the network 200. Moreover, the core network may not be aware of whether a network slice could be available by dual-connectivity, carrier aggregation, or handover/redirection upon the UE's request to the frequency carrier providing the available network slice.

Figure 3:
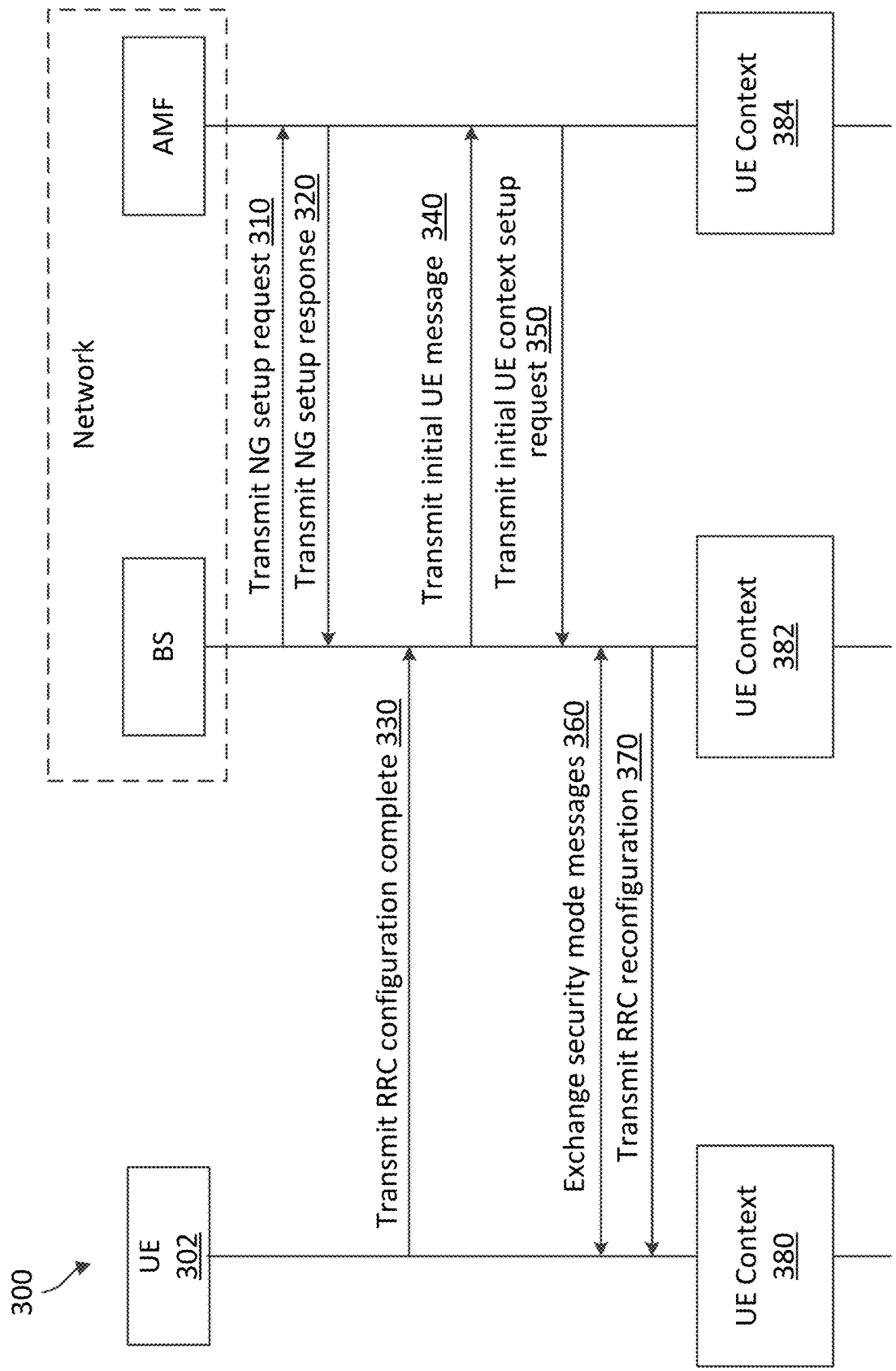
FIG. 3 is a signaling diagram illustrating a network registration method according to some embodiments of the present disclosure.

FIG. 3 is a signaling diagram illustrating a network slicing provisioning method 300 according to some embodiments of the present disclosure. The method 300 may be implemented by a UE 302 similar to the UEs 115 and 215, a BS similar to the BSs 105 and 205, and an AMF (e.g., a component of a core network such as the core network 230). The BS and the AMF may generally be referred to as the network side. Steps of the method 300 can be executed by computing devices (e.g., a processor, processing circuit, and/or other suitable component) of the BS, the UE, and an AMF component. As illustrated, the method 300 includes a number of enumerated steps, but embodiments of the method 300 may include additional steps before, after, and in between the enumerated steps. In some embodiments, one or more of the enumerated steps may be omitted or performed in a different order.

At step 310, the BS transmits a next generation (NG) setup request message to the AMF. The NG setup request message indicates one or more network slices (e.g., the network slices 250) supported by the BS. In an example, the NG setup request message may include a single-network slice selection assistance information (S-NSSAI) list per tracking area.

At step 320, in response to the NG setup request message, the AMF transmits a NG setup response message to the BS. Based on the NG setup request message, the AMF may have knowledge of the network slices supported by the BS and/or the tracking area of the BS. The AMF may perform similar NG setup request and response message exchange with other BSs, and thus the AMF may have knowledge of network slices supported by the other BSs and/or other tracking areas.

At step 330, the UE transmits an RRC connection setup completion message to the BS. For example, the UE may have completed a successful random access procedure with the BS. The random access procedure may include the exchange of MSG 1, MSG 2, MSG 3, and MSG 4 described above with respect to FIG. 1. In some instances, the RRC connection setup completion message is exchanged after MSG 4, and may be referred to as a message 5 (MSG 5).

In an example, the RRC connection setup completion message may include a NAS registration request. The NAS registration request may include requested-NSSAI. The requested-NSSAI may indicate one or more network slices (e.g., the network slices 250) requested by the UE, for example, based on applications that may be used by the UE or potentially used by the UE.

At step 340, upon receiving the RRC connection setup completion message including the NAS registration request, the BS transmits an initial UE message to the AMF. The initial UE message may include the NAS registration request.

At step 350, in response to the initial UE message, the AMF transmits an initial UE context setup request message to the BS. The initial UE context setup request message may include allowed NSSAI. The allowed NSSAI may indicate requested network slices that are allowed in the tracking area. The allowed NSSAI may be a minimal common set of requested-NSSAI, subscribed NSSAI, and NSSAI supported by a current tracking area. The initial UE context setup request message may include a NAS registration accept message including the allowed NSSAI. In an example, the UE may include a slice A (e.g., the network slice 250) and a slice B (e.g., the network slice 252) in the requested-NSSAI at the step 330. The AMF may allow slice A, but may reject slice B. In such an example, the AMF may include allowed NSSAI and rejected NSSAI in the initial UE context setup request message. The allowed NSSAI may indicate the slice A and the rejected NSSAI may indicate the slice B.

At step 360, after receiving the initial UE context setup request message from the AMF, the BS and the UE perform a security mode control procedure to exchange various security mode messages.

At step 370, after completing the security mode control procedure, the BS transmits an RRC reconfiguration message to the UE. The RRC reconfiguration message may include a NAS registration accept message indicating allowed NSSAI. At this time, the UE may have a UE context 380 including configured NSSAI, the requested NSSAI, the allowed NSSAI, and/or the rejected NSSAI. The BS may have a UE context 382 including the allowed NSSAI and NSSAI of active PDU sessions of the UE. The AMF may include a UE context 384 including subscribed NSSAI, the requested NSSAI, the allowed NSSAI, and the rejected NSSAI.

Current network slicing technology may have various restrictions. For example, slice support is uniform in a tracking area. Frequency carriers with different slice support are typically configured in different tracking areas. All slices in allowed NSSAI are supported by a tracking area. The UE may not be allowed to request a slice that is indicated in the rejected NSSAI except when there is a tracking area change. The UE may only request a PDU session establishment over a slice within the allowed NSSAI. The restrictions on the current network slicing technology and the lack of slice-to-frequency mapping information available at the BS and/or the UE may cause challenges in providing network slices requested by the UE to the UE. For example, the current network slicing technology prevents a UE from running services on network slices that are not supported by the serving cell. Additionally, the UE may be unable to establish PDU sessions over network slices outside of allowed NSSAI. Moreover, current standards do not provide signaling for the UE to reselect to a cell that supports desired network slices or to request desired network slices.

In some examples, the UE may occupy a tracking area that does not support a network slice that is requested by the UE. If the UE's requested network slice is not supported by a current tracking area, the network slice may be available for the UE in a different tracking area. For example, the requested network slice may be available to the UE by dual-connectivity, carrier aggregation, or handover/redirection upon request to a neighboring cell and/or tracking area.

Accordingly, the present disclosure provides various techniques for the UE, the BS, and/or the 5GC to communicate with each other to provide and/or determine availability of the UE's requested network slices in non-current tracking areas and provide an indication of the available network slices to the core network and/or the UE. For example, it may be advantageous to provide the 5GC with information on whether a network slice could be available by dual-connectivity, carrier aggregation, or handover/redirection upon the UE's request (e.g., whether the UE is capable of support dual-connectivity, carrier aggregation, or handover/redirection to the cell frequency that provides the network slice). Additionally, it may be advantageous to provide the RAN (e.g., BS) with information on whether a network slice could be available by dual-connectivity, carrier aggregation, or handover/redirection upon the UE's request. Moreover, it may also be advantageous to provide the UE with information on whether a rejected network slice or whether a current tracking area non-supporting slice could be available by dual-connectivity/carrier aggregation or handover/redirection upon the UE's request. The present disclosure provides various techniques to provide information to the UE, the BS, and/or the 5GC on whether a network slice could be available (e.g., by dual-connectivity/carrier aggregation or handover/redirection upon the UE's request).

Figure 4:
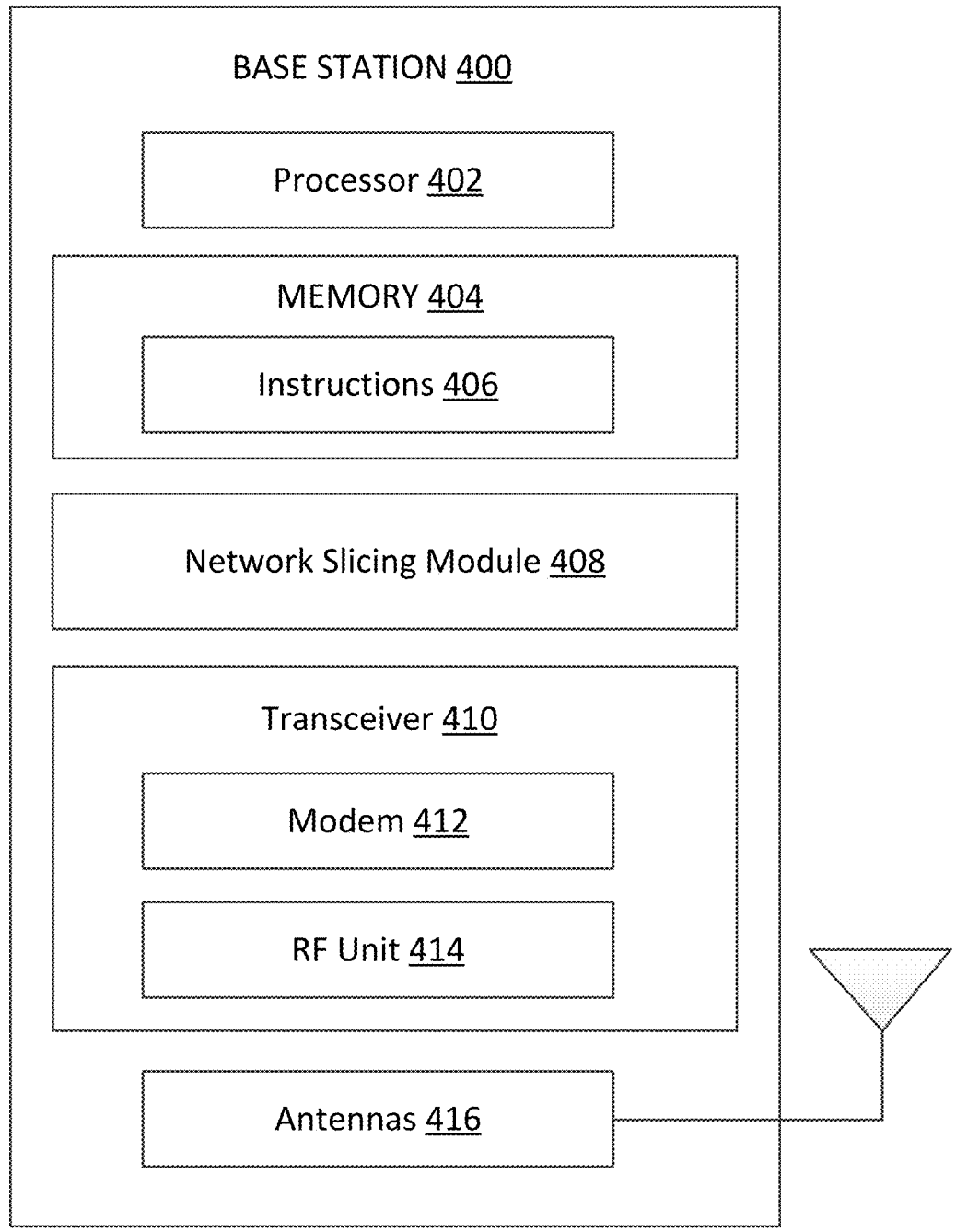
FIG. 4 is a block diagram of an exemplary base station (BS) according to some embodiments of the present disclosure.

FIG. 4 is a block diagram of an exemplary BS 400 according to embodiments of the present disclosure. The BS 400 may be a BS 105 or BS 205 as discussed above in FIGS. 1 and 2, respectively, or a BS as discussed in FIG. 3. As shown, the BS 400 may include a processor 402, a memory 404, a network slicing module 408, a transceiver 410 including a modem subsystem 412 and a RF unit 414, and one or more antennas 416. These elements may be in direct or indirect communication with each other, for example via one or more buses.

The processor 402 may have various features as a specific-type processor. For example, these may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, a solid state memory device, one or more hard disk drives, memristor-based arrays, other forms of volatile and non-volatile memory, or a combination of different types of memory. In some embodiments, the memory 404 may include a non-transitory computer-readable medium. The memory 404 may store, or have recorded thereon, instructions 406. The instructions 406 may include instructions that, when executed by the processor 402, cause the processor 402 to perform operations described herein with reference to the BSs 105 in connection with embodiments of the present disclosure, for example, aspects of FIGS. 3 and 7-9. Instructions 406 may also be referred to as program code. The program code may be for causing a wireless communication device to perform these operations, for example by causing one or more processors (such as processor 402) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The BS 400 is configured to establish a connection with a UE (e.g., the UEs 115, 215, and/or 600). In an example, the BS establishes the connection with the UE after the UE transmits the RRC connection setup completion message to the BS 400 (see step 330 in FIG. 3).

The network slicing module 408 may be implemented via hardware, software, or combinations thereof. For example, the network slicing module 408 may be implemented as a processor, circuit, and/or instructions 406 stored in the memory 404 and executed by the processor 402. In some examples, the network slicing module 408 can be integrated within the modem subsystem 412. For example, the network slicing module 408 can be implemented by a combination of software components (e.g., executed by a DSP or a general processor) and hardware components (e.g., logic gates and circuitry) within the modem subsystem 412.

The network slicing module 408 may be used for various aspects of the present disclosure, for example, aspects of FIGS. 3 and 7-9. The network slicing module 408 is configured to serve a UE (e.g., the UEs 115, 215, and/or 600) over a first cell frequency (e.g., the frequency carrier 220), receive, from the UE, a network registration request indicating one or more requested network slices (e.g., eMBB slices and/or URLLC slices similar to the network slices 250 and 252) of the network, forward the network registration request to the core network, receive, from the core network, a network registration response indicating at least a first network slice (e.g., a URLLC slice) of the one or more requested network slices is available on-demand or is allowed, where the first network slice is not supported by the current tracking area, and/or forward, to the UE, the network registration response. The indication of the un-supported first network slice being allowed is based on a second cell frequency of the network providing the first network slice.

The network slicing module 408 is configured to receive, from the UE, a network slice request. The network slice request may be a request for one or more network slices of a network. In an example, a first set of requested network slices is supported by the tracking area, and a second set of requested network slices is not supported by the tracking area. In an example, a network registration message (e.g., NAS registration message) may indicate one or more network slices requested by the UE, where at least one requested network slice is not supported by a cell frequency on which the UE is currently camped or with which the UE is associated.

The network slicing module 408 is further configured to receive, from the core network entity, a request for capability information associated with the UE based on the UE's network slice request. In an example, the request is a UE capability check request indicating at least the second set of requested network slices. The request may also indicate one or more of the first set of requested network slices. Additionally, the core network entity may be the AMF.

The network slicing module 408 is further configured to transmit, to the core network entity, a response indicating the capability information associated with the UE. In an example, the request is a UE capability check response indicating network slices included in the UE capability check request that are available. A network slice is available if the network slice is available on a second cell frequency. In an example, the available network slice is not supported by the first cell frequency associated with the current tracking area. The UE may request the available network slice on-demand.

Mechanisms for providing an indication of the network slices that are available to the UE in a tracking area different from the current tracking area are described in greater detail herein.

As shown, the transceiver 410 may include the modem subsystem 412 and the RF unit 414. The transceiver 410 can be configured to communicate bi-directionally with other devices, such as the UEs 115, 215, 302, and/or 600 and/or another core network element. The modem subsystem 412 may be configured to modulate and/or encode data from the memory 404 and/or the network slicing module 408 according to a modulation and coding scheme (MCS), e.g., a low-density parity check (LDPC) coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data (e.g., NAS messages, RRC messages, URLLC data, and/or eMBB data) from the modem subsystem 412 (on outbound transmissions) or of transmissions originating from another source such as a UE 115, 302, or 600. The RF unit 414 may be further configured to perform analog beamforming in conjunction with the digital beamforming. Although shown as integrated together in transceiver 410, the modem subsystem 412 and/or the RF unit 414 may be separate devices that are coupled together at the BS 105 to enable the BS 105 to communicate with other devices.

The RF unit 414 may provide the modulated and/or processed data, e.g. data packets (or, more generally, data messages that may contain one or more data packets and other information), to the antennas 416 for transmission to one or more other devices. This may include, for example, transmission of information to complete attachment to a network and communication with a camped UE 115, 302, or 600 according to embodiments of the present disclosure. The antennas 416 may further receive data messages transmitted from other devices and provide the received data messages for processing and/or demodulation at the transceiver 410. The transceiver 410 may provide the demodulated and decoded data (e.g., NAS messages, RRC messages, URLLC data, and/or eMBB data) to the network slicing module 408 for processing. The antennas 416 may include multiple antennas of similar or different designs in order to sustain multiple transmission links.

In an embodiment, the BS 400 can include multiple transceivers 410 implementing different RATs (e.g., NR and LTE). In an embodiment, the BS 400 can include a single transceiver 410 implementing multiple RATs (e.g., NR and LTE). In an embodiment, the transceiver 410 can include various components, where different combinations of components can implement different RATs.

Figure 5:
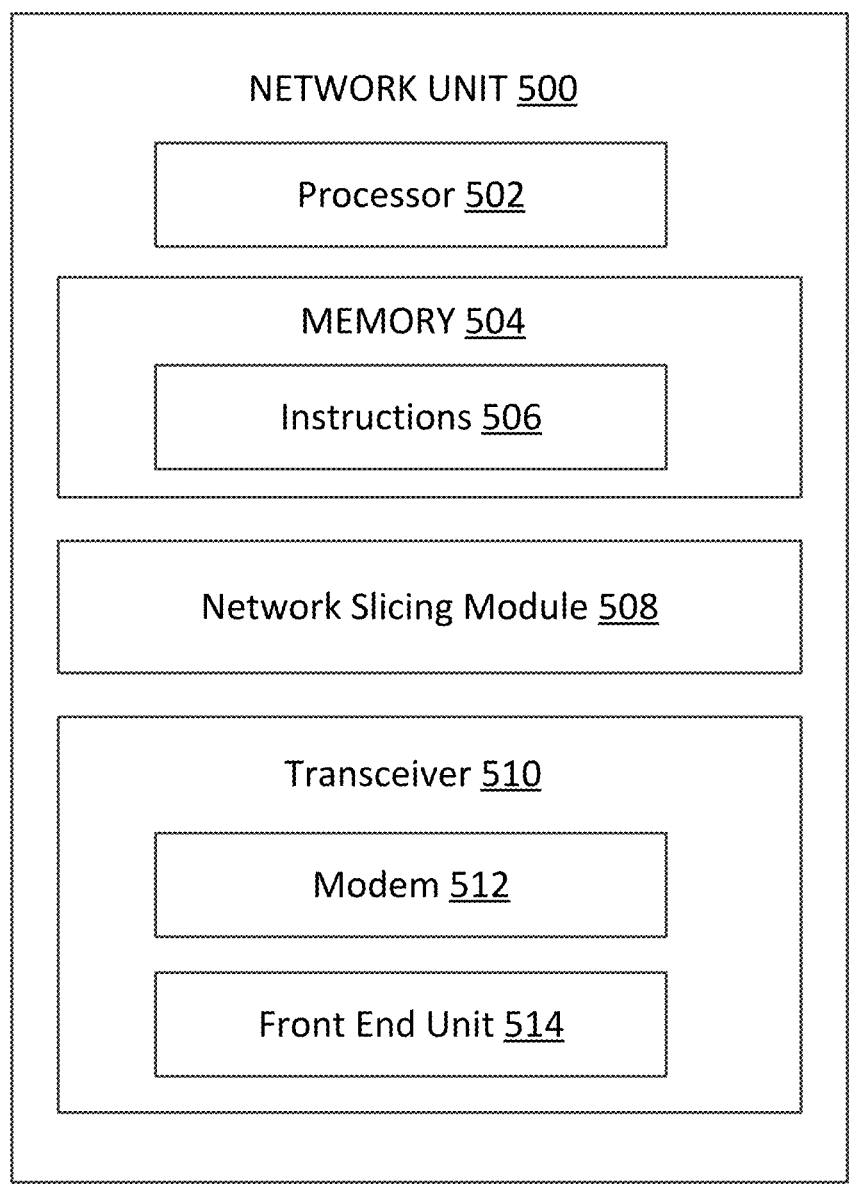
FIG. 5 is a block diagram of an exemplary network unit according to some embodiments of the present disclosure.

FIG. 5 illustrates a block diagram of an exemplary network unit 500 according to embodiments of the present disclosure. The network unit 500 may be a core network component of a core network such as the core network 230 discussed above in FIG. 2. A shown, the network unit 500 may include a processor 502, a memory 504, a network slicing module 508, and a transceiver 510 including a modem subsystem 512 and a frontend unit 514. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 504 may include a non-transitory computer-readable medium. The memory 504 may store instructions 506. The instructions 506 may include instructions that, when executed by the processor 502, cause the processor 502 to perform operations described herein, for example, aspects of FIGS. 3 and 7-9. Instructions 506 may also be referred to as code, which may be interpreted broadly to include any type of computer-readable statement(s) as discussed above with respect to FIG. 4.

The network slicing module 508 may be implemented via hardware, software, or combinations thereof. For example, the network slicing module 508 may be implemented as a processor, circuit, and/or instructions 506 stored in the memory 504 and executed by the processor 502. The network slicing module 508 may be used for various aspects of the present disclosure, for example, aspects of FIGS. 3 and 7-9. For example, the network slicing module 508 is configured to receive, from a UE (e.g., the UEs 115, 215, and/or 600) via a BS (e.g., the BSs 105, 205, and/or 400) in a first cell frequency (e.g., the frequency carrier 220), a network registration request indicating one or more network slices (e.g., eMBB slices and/or URLLC slices similar to the network slices 250 and 252) of the network, determine that a first network slice (e.g., a URLLC slice) of the one or more requested network slices is not supported the first cell frequency that UE is on, determine that the first network slice is supported by a second cell frequency (e.g., the frequency carrier 222) of the network, transmit, to the UE, a network registration response indicating that the first network slice is available on-demand at the UE's request.

Additionally, the network slicing module 508 may participate in a handover of the UE to the second cell frequency, a dual-connectivity of the UE with the second cell frequency, or a carrier aggregation of the UE with second cell frequency.

Mechanisms for providing an indication of the network slices that are available to the UE or are allowed in a tracking area different from the current tracking area are described in greater detail herein.

As shown, the transceiver 510 may include the modem subsystem 512 and the frontend unit 514. The transceiver 510 can be configured to communicate bi-directionally with other devices, such as the BSs 105, 205, and 400 and/or another core network element. The modem subsystem 512 may be configured to modulate and/or encode data according to a MCS, e.g., a LDPC coding scheme, a turbo coding scheme, a convolutional coding scheme, etc. The frontend unit 514 may include electrical-to-optical (E/O) components and/or optical-to-electrical (O/E) components that convert an electrical signal to an optical signal for transmission to a BS such as the BSs 105, 205, and 400 and/or receive an optical signal from the BS and convert the optical signal into an electrical signal, respectively. The frontend unit 514 may be configured to process (e.g., perform analog to digital conversion or digital to analog conversion, optical to electrical conversion or electrical to optical conversion, etc.) modulated/encoded data from the modem subsystem 512 (on outbound transmissions) or of transmissions originating from another source such as a backend or core network. Although shown as integrated together in transceiver 510, the modem subsystem 512 and the frontend unit 514 may be separate devices that are coupled together at the network unit 500 to enable the network unit 500 to communicate with other devices. The frontend unit 514 may transmit optical signal carrying the modulated and/or processed data over an optical link such as the links 232. The frontend unit 514 may further receive optical signals carrying data messages and provide the received data messages for processing and/or demodulation at the transceiver 510.

Figure 6:
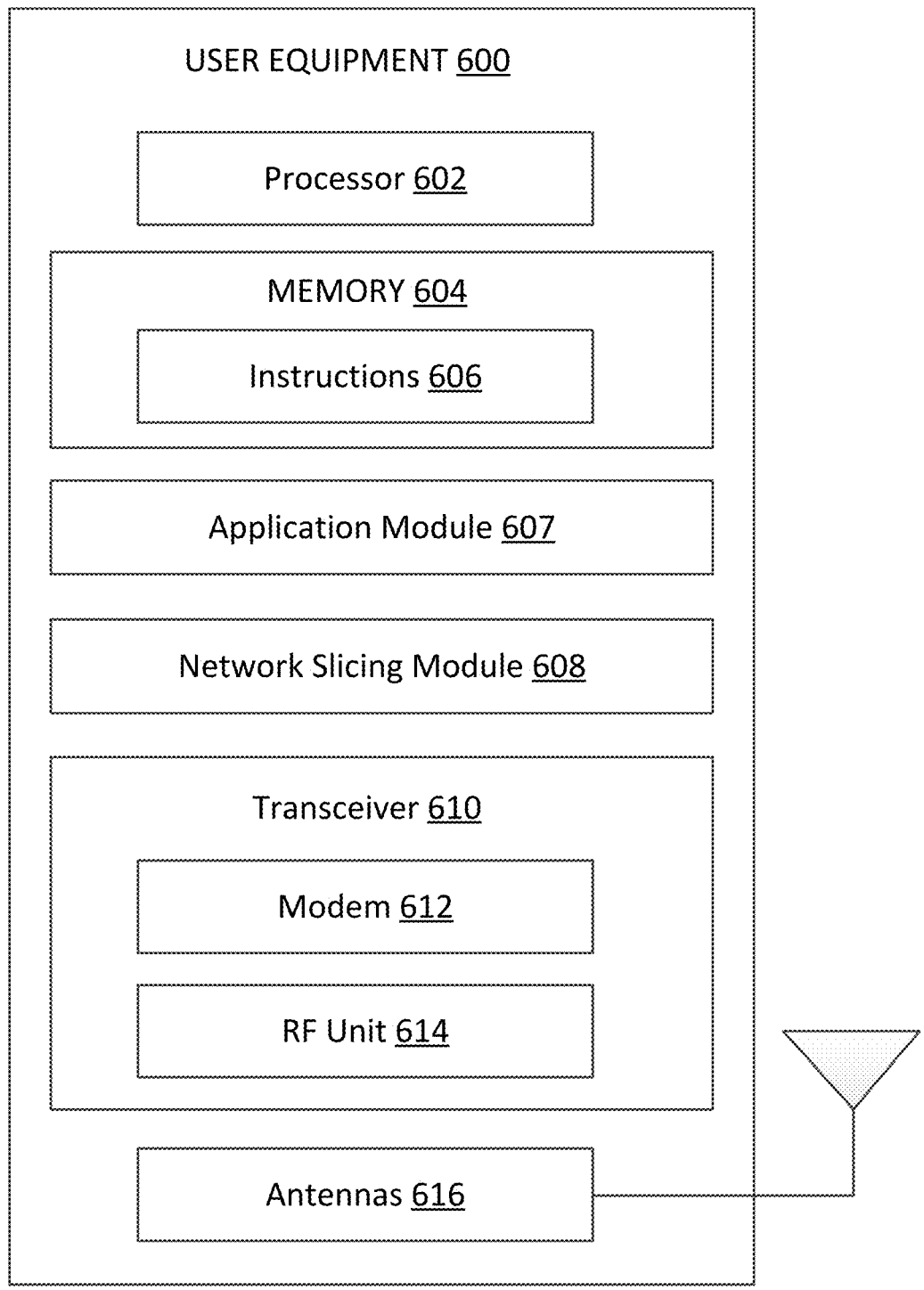
FIG. 6 is a block diagram of a user equipment (UE) according to some embodiments of the present disclosure.

FIG. 6 is a block diagram of an exemplary UE 600 according to embodiments of the present disclosure. The UE 600 may be a UE 115 or a UE 215 discussed above in FIGS. 1 and 2, respectively, or a UE as discussed in FIG. 3. As shown, the UE 600 may include a processor 602, a memory 604, a network slicing module 608, a transceiver 610 including a modem subsystem 612 and a radio frequency (RF) unit 614, and one or more antennas 616. These elements may be in direct or indirect communication with each other, for example via one or more buses.

The processor 602 may have various features as a specific-type processor. For example, these may include a CPU, a DSP, an ASIC, a controller, a FPGA device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 604 may include a non-transitory computer-readable medium. The memory 604 may store instructions 606. The instructions 606 may include instructions that, when executed by the processor 602, cause the processor 602 to perform operations described herein, for example, aspects of FIGS. 3 and 7-9. Instructions 606 may also be referred to as code, which may be interpreted broadly to include any type of computer-readable statement(s) as discussed above with respect to FIG. 4.

The network slicing module 608 may be implemented via hardware, software, or combinations thereof. For example, the network slicing module 608 may be implemented as a processor, circuit, and/or instructions 606 stored in the memory 604 and executed by the processor 602. In some examples, the network slicing module 608 can be integrated within the modem subsystem 612. For example, the network slicing module 608 can be implemented by a combination of software components (e.g., executed by a DSP or a general processor) and hardware components (e.g., logic gates and circuitry) within the modem subsystem 612. A UE may include the network slicing module 608.

The network slicing module 608 may be used for various aspects of the present disclosure, for example, aspects of FIGS. 3, 7-9. The network slicing module 608 is configured to perform an association with a BS (e.g., the BSs 105 and/or 205) operating over a first cell frequency (e.g., the frequency carrier 220) of a network (e.g., the networks 100 and/or 200). The association can be based on a cell selection, a camping procedure, a random access procedure, and/or a RRC connection set up. The network slicing module 608 is configured to transmit, via the BS in the first cell frequency to a core network (e.g., the core network 230) of the network, a network registration indicating one or more network slices (e.g., eMBB slices and/or URLLC slices similar to e the network slices 250 and 252) of the network, and receive, from the core network, a network registration response indicating at least a first network slice (e.g., a URLLC slice) of the one or more requested network slices is available on-demand or is allowed while the requested network slice is not supported by the first cell frequency. The indication of the un-supported first network slice being allowed is based on a second cell frequency of the network providing the first network slice. The network slicing module 608 may receive an instruction to perform a handover to a second cell frequency that provides the requested network slice, perform a dual-connectivity with the second cell frequency, or perform a carrier aggregation with the second cell frequency, perform the handover, the dual-connectivity, and/or the carrier aggregation based on the received instruction, and/or communicate data over a PDU session on the second cell frequency after performing the handover, the dual-connectivity, or the carrier aggregation.

In an embodiment, the network slicing module 608 is configured to transmit a request for a network slice of a network and receive a response indicating a rejection of the requested network slice and a cause of the rejection. In an example, the requested network slice is not supported by the current tracking area. The response may be a NAS registration response message that includes a first cause-value indicating that the rejection is due to the S-NSSAI not being available in the current tracking area, but can be supported by NG-RAN controlled mobility on-demand.

Mechanisms for requesting network slices that are not allowed in the current tracking area and for receiving an indication of network slices that are available to the UE or are allowed in a tracking area different from the current tracking area are described in greater detail herein.

As shown, the transceiver 610 may include the modem subsystem 612 and the RF unit 614. The transceiver 610 can be configured to communicate bi-directionally with other devices, such as the BSs 105. The modem subsystem 612 may be configured to modulate and/or encode the data from the memory 604 and/or the network slicing module 608 according to a MCS, e.g., a LDPC coding scheme, a turbo coding scheme, a convolutional coding scheme, a digital beamforming scheme, etc. The RF unit 614 may be configured to process (e.g., perform analog to digital conversion or digital to analog conversion, etc.) modulated/encoded data (e.g., NAS messages, RRC messages, eMBB data, URLLC data) from the modem subsystem 612 (on outbound transmissions) or of transmissions originating from another source such as a UE 115 or a BS 105. The RF unit 614 may be further configured to perform analog beamforming in conjunction with the digital beamforming. Although shown as integrated together in transceiver 610, the modem subsystem 612 and the RF unit 614 may be separate devices that are coupled together at the UE 115 to enable the UE 115 to communicate with other devices.

The RF unit 614 may provide the modulated and/or processed data, e.g. data packets (or, more generally, data messages that may contain one or more data packets and other information), to the antennas 616 for transmission to one or more other devices. The antennas 616 may further receive data messages transmitted from other devices. The antennas 616 may provide the received data messages for processing and/or demodulation at the transceiver 610. The transceiver 610 may provide the demodulated and decoded data (e.g., NAS messages, RRC messages, URLLC data, eMBB data) to the network slicing module 608 for processing. The antennas 616 may include multiple antennas of similar or different designs in order to sustain multiple transmission links. The RF unit 614 may configure the antennas 616.

In an embodiment, the UE 600 can include multiple transceivers 610 implementing different RATs (e.g., NR and LTE). In an embodiment, the UE 600 can include a single transceiver 610 implementing multiple RATs (e.g., NR and LTE). In an embodiment, the transceiver 610 can include various components, where different combinations of components can implement different RATs.

Figure 7:
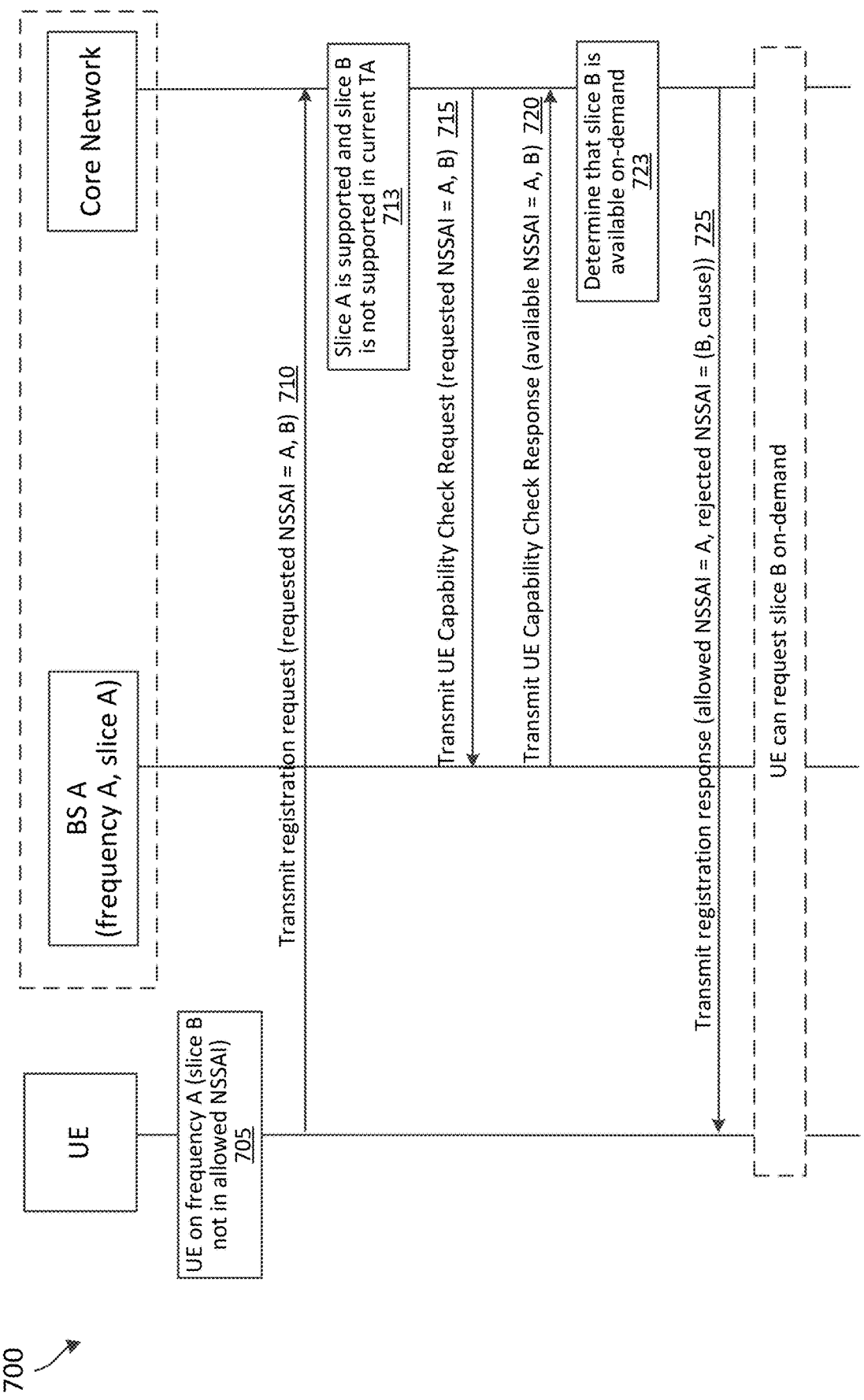
FIG. 7 is a signaling diagram illustrating an on-demand method with network slicing according to some embodiments of the present disclosure.

FIG. 7 is a signaling diagram illustrating an on-demand method 700 according to some embodiments of the present disclosure. The method 700 may be implemented by a UE, a BS A, and a core network in a network similar to the networks 100 and/or 200. The BS A may be similar to the BSs 105, 205, and/or 400 and may implement at least part of the method 700. The core network may be similar to the core network 230 and may include one or more network components similar to the network unit 500. In an example, the core network may include an AMF component (e.g., the network unit 500) that implements at least part of the method 700. The UE may be similar to the UEs 115, 215, and/or 600 and may implement at least part of the method 700. As illustrated, the method 700 includes a number of enumerated steps, but embodiments of the method 700 may include additional steps before, after, and in between the enumerated steps. In some embodiments, one or more of the enumerated steps may be omitted or performed in a different order.

In the method 700, the BS A may operate over a frequency A (e.g., the frequency carrier 220) supporting a network slice A (e.g., an eMBB slice similar to the slice 250). The eMBB slice may support eMBB and/or voice services on the frequency A. The network may include a slice B on a frequency B (e.g., the frequency carrier 222) of the network supporting a slice B (e.g., a URLLC slice similar to the slice 252). The frequency A may be under a tracking area with a TAC 1. The frequency B may be under another tracking area with a TAC 2 different from the TAC 1. In other words, the 2.6 GHz carrier and the 4.9 GHz carrier may be serving different tracking areas. The method 700 may begin after the UE has associated with the BS A over the frequency A. For example, the UE has completed a random access procedure with the BS A.

At step 705, the UE is associated with frequency A, where slice B is not included in allowed NSSAI for frequency A. The UE may have performed a random access procedure over the frequency A with the BS A.

At step 710, the UE transmits a NAS registration request message to the core network via the BS A. The registration request message may include requested-NSSAI indicating the slice A and the slice B.

The core network receives the registration request message from the UE. The core network may know the network slice capability of one or more BSs included in one or more tracking areas. For example, the BS A may transmit a NG setup request to the AMF, the NG setup request indicating that the slice A is supported by the BS A (see step 310 in FIG. 3). Accordingly, the core network may be aware that the BS A supports slice A, but does not support slice B. If any of the UE's requested network slices (in step 710) are not supported by the current tracking area and/or TAI, the core network (e.g., the AMF) may check NG-RAN support for the UE requested network slices by utilizing an enhanced UE capability check procedure.

Upon receiving the NAS registration request message, the core network determines whether the UE's requested slices are supported in the current tracking area. A network slice that is supported in a current tracking area may also be referred to as a network slice that is allowed over the current cell frequency. At step 713, the core network determines that the slice A is supported in the current tracking area and that slice B is not supported in the tracking area.

At step 715, the core network transmits a UE capability check request message to the BS A. In an example, the core network transmits the UE capability check request message to the BS A in response to determining that a network slice requested by the UE is not supported by the current TAI. The UE capability check request message may include requested-NSSAI indicating the requested slices that are or are not supported by the current tracking area and/or TAI. In an example, the UE capability check request message may include requested-NSSAI indicating the slice A and the slice B.

At step 720, the BS A transmits a UE capability check response message to the core network. The UE capability check response message may include network slices that may be supported by the NG-RAN, but not necessarily supported by the current tracking area. In an example, the BS A may determine the UE's radio capability, the network's capability, and/or whether the UE's radio capability and the network's capability matches. For example, regarding the UE's radio capability, the BS A may check the UE's supported frequency bands, the UE's frequency band combinations, the UE's dual-connectivity and/or carrier aggregation capability, the UE's measurement capability, the UE's mobility capability (e.g., handover (HO) capability). Regarding the network's capability, the BS A may communicate with its neighboring cells and check the network slices supported by the neighboring cells and the frequencies of the requested NSSAI requested by the UE in step 710. The BSs may exchange capability information and configuration information. For example, based on the neighbor cell capability, the BS A may determine whether the requested network slices could be supported by a DC/CA and/or HO/redirection to the neighbor cell. Additionally, the BS A may configure the neighbor cell into DC/CA mode. With the information on the UE and the network capabilities, the BS A may determine whether the capabilities of the UE and the network match. In an example, the BS A may determine, based on the UE's radio capability and the network's capability, whether a network slice requested by the UE may be supported by the network (e.g., by a neighboring cell). The BS A may indicate those requested network slices that can be supported by the network in the available NSSAI.

In some examples, the NG-RAN indicates a list of network slice combinations. For example, the UE or network may support different frequency band combinations. For example, the UE or network may support network slice A or network slice B, but not the combination of network slices A and B.

In some examples, a core network entity (e.g., the AMF) determines the UE and RAN capability checklist. The AMF may determine a set of UE capabilities associated with a network slice requested by the UE in the network. In an example, the AMF may store the UE's capabilities in a table, and the AMF determines the set of UE capabilities based on a table lookup from the configuration. The table may store a list of UE and RAN capabilities that are required to support the requested slices. The AMF may request the NG-RAN to help check whether these capabilities are supported by the UE and the RAN, and may then determine whether the UE and the RAN capabilities are aligned or match. Capabilities may include frequency band combinations (if the slices are deployed only on a certain frequency). The AMF may take into consideration capabilities such as Ethernet header compression or other capabilities defined in RAN or for the UE. For example, the AMF may take into consideration capability bits that are related to supporting a network slice. The AMF may transmit the capability checklist to the RAN as part of the UE capability check request. The RAN may respond with a first value for a network slice (e.g., YES or 1) if the RAN supports the network slice and may respond with a second value for a network slice (e.g., NO or 0) if the RAN does not support the network slice. The RAN may determine whether to respond with the first or second value for a network slice based on whether the RAN and/or UE capabilities match for the network slice (e.g., whether the RAN can serve the network slice to the UE).

The core network receives the UE capability check response message from the BS A. In FIG. 7, the UE capability check response message may include available NSSAI indicating the slice A and the slice B. At step 723, the core network determines, based on the UE capability check response message, that slice B is available on-demand. The core network may provide an indication that the slice B is available on-demand to the UE.

In response to the NAS registration request message, the core network may transmit a NAS registration accept or response message to the UE via the BS A. At step 725, the core network transmits a NAS registration response message to the UE via the BS A. The NAS registration response message may include allowed NSSAI indicating the slice A and include rejected NSSAI indicating slice B. In an example, the core network may indicate that the slice B is rejected, but could be available when the UE requests the slice. In an example, the NAS procedure may be enhanced by providing a cause for rejecting a S-NSSAI, where the cause indicates that the S-NSSAI is rejected, but may be made available upon on-demand. The BS A may indicate various causes for rejecting a S-NSSAI. For example, a first cause-value may indicate that the rejection is due to the S-NSSAI not being available in the current tracking area, but can be supported by NG-RAN controlled mobility on-demand. In another example, a second cause-value may indicate that the rejection is due to the S-NSSAI not being available in the current PLMN. In another example, a third cause-value may indicate that the rejection is due to the S-NSSAI not being available in the current tracking area. In general, the BS A may indicate any of the causes described in the 3GPP document TS 24.501 and/or the additional cause(s) described above.

After the step 725, the UE may request slice B on-demand. The rejected slice indicated in the NAS registration response message may be available upon request by the UE. In some examples, the UE may request slice B on-demand by transmitting an on-demand request for slice B (e.g., via a service request or PDU session request) and the core network and/or the BS may trigger the UE to perform a dual-connectivity, carrier aggregation, or a handover to access a frequency carrier that serves the slice B. In some other examples, the UE may request slice B on-demand by transmitting an on-demand request to request for frequency to network slice mapping information for the interested network slice. In response to the UE's request for the slice B, the UE may receive frequency to network slice mapping information for the network slice B, and perform a network slice-aware cell selection and/or reselection.

In an example, the method 700 can be applied in a network deployment with a 2.6 GHz carrier (e.g., the frequency A) and a 4.9 GHz carrier (e.g., the frequency B), where the 2.6 GHz carrier is configured for eMBB slices (e.g., the network slices 250) serving eMBB services and voice services and the 4.9 GHz carrier is configured for eMBB slices serving URLLC services.

If any requested slice it not included in the allowed NSSAI and cannot be supported on-demand, the UE may take actions to ensure service is available using an alternative way.

Figure 8:
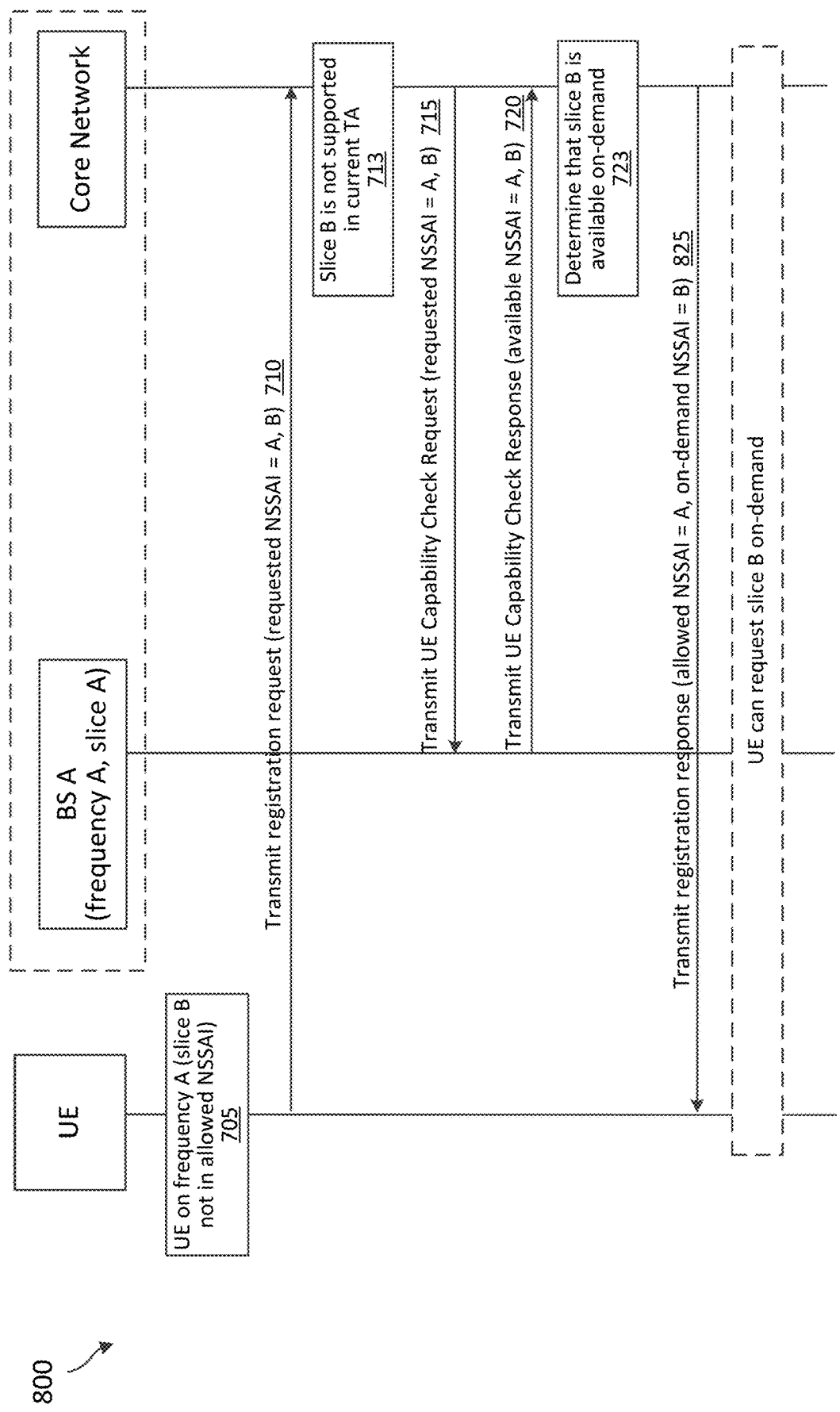
FIG. 8 is a signaling diagram illustrating an on-demand method with network slicing according to some embodiments of the present disclosure.

FIG. 8 is a signaling diagram illustrating an on-demand method 800 according to some embodiments of the present disclosure. The method 800 may be implemented by a UE, a BS A, and a core network in a network similar to the networks 100 and/or 200. The BS A may be similar to the BSs 105, 205, and/or 400 and may implement at least part of the method 800. The core network may be similar to the core network 230 and may include one or more network components similar to the network unit 500. In an example, the core network may include an AMF component (e.g., the network unit 500) that implements at least part of the method 800. The UE may be similar to the UEs 115, 215, and/or 600 and may implement at least part of the method 800. As illustrated, the method 800 includes a number of enumerated steps, but embodiments of the method 800 may include additional steps before, after, and in between the enumerated steps. In some embodiments, one or more of the enumerated steps may be omitted or performed in a different order.

The method 800 includes steps 705, 710, 713, 715, 720, and 723. At step 825, the core network transmits a NAS registration accept message to the UE via the BS A. The NAS procedure may be enhanced by providing a parameter for indicating slices that can be supported on-demand. For example, the NAS registration accept message may include allowed NSSAI indicating the slice A and include on-demand NSSAI indicating one or more slices that can be supported on-demand (e.g., slice B). The on-demand slice indicated in the NAS registration accept message may be available upon request by the UE. In an example, the core network may indicate that the slice B can be available when the UE requests the slice.

If any requested slice it not included in the allowed NSSAI and cannot be supported on-demand, the UE may take actions to ensure service is available using an alternative way.

Figure 9:
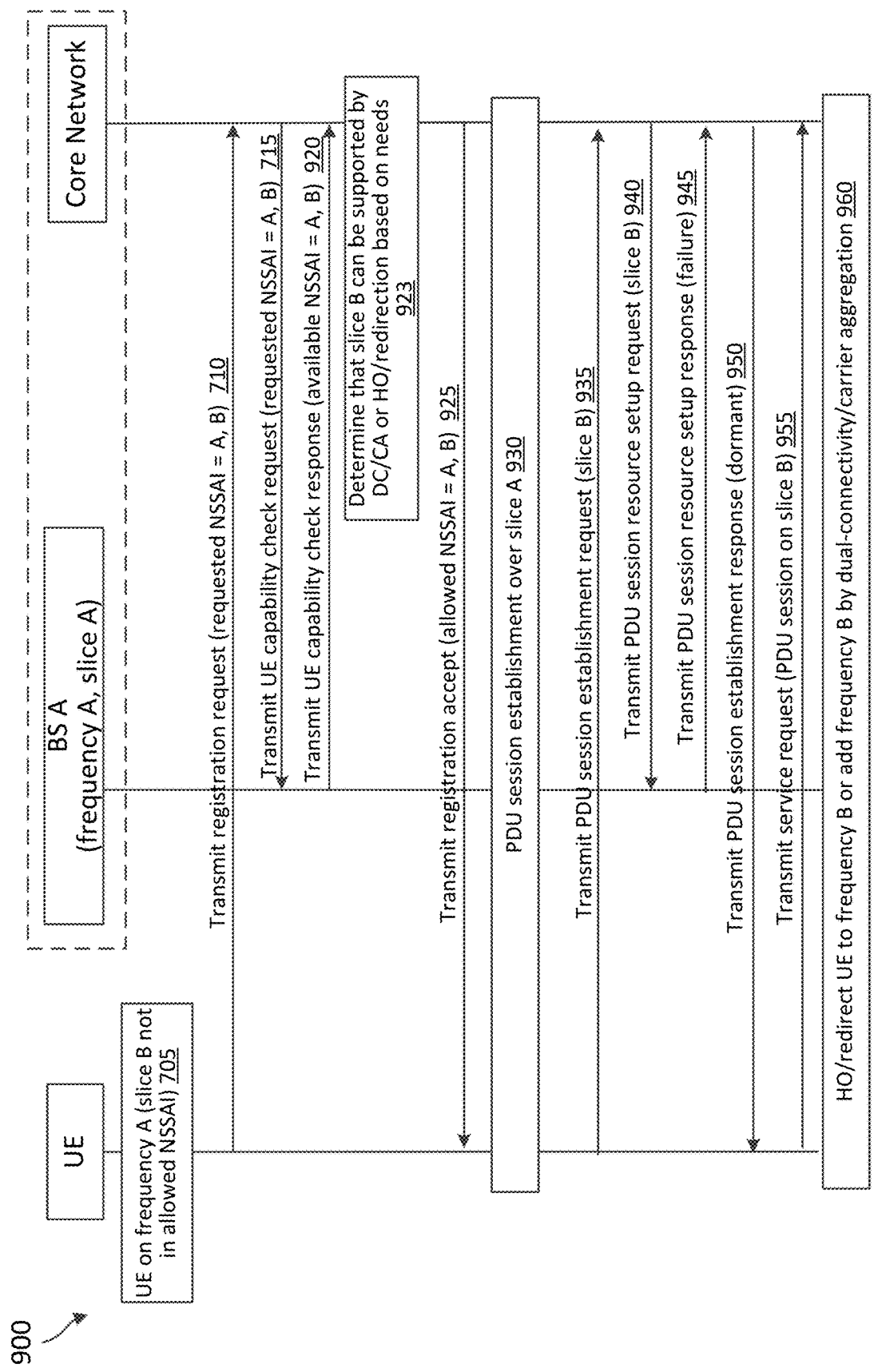
FIG. 9 is a signaling diagram illustrating an on-demand method according to some embodiments of the present disclosure.

FIG. 9 is a signaling diagram illustrating an on-demand method 900 according to some embodiments of the present disclosure. The method 900 may be implemented by a UE, a BS A, and a core network in a network similar to the networks 100 and/or 200. The BS A may be similar to the BSs 105, 205, and/or 400. The core network may be similar to the core network 230 and may include one or more network components similar to the network unit 500. In an example, the core network may include an AMF component (e.g., the network unit 500) that implements at least part of the method 900. The UE may be similar to the UEs 115, 215, and/or 600. As illustrated, the method 000 includes a number of enumerated steps, but embodiments of the method 900 may include additional steps before, after, and in between the enumerated steps. In some embodiments, one or more of the enumerated steps may be omitted or performed in a different order.

In the method 900, the BS A may operate over a frequency A (e.g., the frequency carrier 220) supporting a slice A (e.g., an eMBB slice similar to the slice 250). The network may include a slice B on a frequency B (e.g., the frequency carrier 222) of the network supporting a slice B (e.g., a URLLC slice similar to the slice 252). The frequency A may be under a tracking area with a TAC 1. The frequency B may be under another tracking area with a TAC 2 different from the TAC 1. The method 900 may begin after the UE has associated with the BS A over the frequency A. For example, the UE has completed a random access procedure with the BS A.

The method 900 includes steps 705, 710, 715, and 720. The core network entity may determine whether a network slice requested by the UE may be supported by NG-RAN (e.g., by a neighboring cell operating in the second cell frequency).

At step 923, the core network determines that slice B can be supported via a handover, a dual-connectivity, or a carrier aggregation based on needs (e.g., on-demand) In an example, the core network may have information associated with network slice-to-frequency mapping based on NG setup request and/or NG setup response exchange with BSs (e.g., the BSs 105, 205, and/or 400). The NG setup request and/or NG setup response exchange may be substantially similar to the steps 310 and 320 of the method 300. The core network may determine which cell frequency of the network provides the network slice requested, and may accordingly determine that the second cell frequency supports slice B. The core network and/or the BS A may participate in at least one of a handover of the UE to the second cell frequency, a dual-connectivity of the UE with the second cell frequency, or a carrier-aggregation of the UE with the second cell frequency based on the determination that slice B can be supported by DC/CA or HO/redirection based on needs. For example, the core network and/or BS A may transmit an instruction to the UE requesting the UE to perform a handover to the second cell frequency that provides the slice B, perform a dual-connectivity with the second cell frequency, or perform a carrier aggregation with the second cell frequency.

At step 925, the core network transmits a NAS registration accept or response message to the UE via the BS A. The core network (e.g., AMF) may indicate a slice that is requested by the UE and supported by the core network in the allowed NSSAI if the slice is supported by the current tracking area and/or TAI, can be supported by configuring supporting secondary cells/primary cells by DC/CA, or can be supported by HO/recited to a supporting cell. The NAS registration accept message may include allowed NSSAI indicating requested NSSAI that are supported by the current tracking area and/or TAI, can be supported by configuring supporting secondary cells/primary cells by DC/CA, or can be supported by HO/recited to a supporting cell. In FIG. 7, the NAS registration accept message indicates slice A, which is supported by the current tracking area, and slice B, which can be supported by DC/CA or HO/redirection to another cell.

The NAS registration response message may include allowed NSSAI indicating that the slice A and the slice B are allowed. In a typical NAS registration process, the allowed NSSAI may not include slice B because slice B is not provided by the current frequency A. However, based on the network slice-to-frequency information that the core network obtained, the core network identified that the slice B is provided by the frequency B. Accordingly, the core network includes the slice B in the allowed NSSAI when responding to the NAS registration request, even though slice B is not supported by the current tracking area.

At step 930, the UE performs a PDU session establishment for the slice A with BS A and the core network. For example, the UE may transmit, to the core network, a PDU session establishment request message to request a PDU session for a service (e.g., an eMBB service) over the slice A. The PDU session establishment request message may include S-NSSAI indicating the slice A.

At step 935, the UE transmits a PDU session establishment request message to the core network requesting a PDU session over the slice B. The PDU session establishment request message includes S-NSSAI indicating the slice B.

At step 940, upon receiving the PDU session establishment request message, the core network transmits a PDU session resource setup request message to the BS A. The PDU session resource setup request message may request the BS A to setup resources for slice B.

At step 945, in response to the PDU session resource setup request message, the BS A transmits a PDU session resource setup response message to the core network. The PDU session resource setup response message may indicate a failure since the BS A does not support the slice B over the frequency A. The PDU session resource setup response message may indicate a cause or reason for the failure and indicate that a handover trigger is required.

At step 950, upon receiving the PDU session resource setup response message, the core network transmits a PDU session establishment response message to the UE via the BS A in the frequency A. The core network may accept the PDU session establishment request, but the PDU session establishment response message may indicate that a PDU session established for the slice B is in a dormant state or inactive mode. There is no resource (e.g., U-plane resources) allocated to the PDU session. The PDU session establishment response message may indicate a PDU session ID for the established PDU session. Accordingly, the PDU session over the slice B may be established even if the RAN resource for its slice is not available.

At step 955, the UE transmits a NAS service request message to the core network. The NAS service request message may indicate the PDU session ID for the slice B. In an example, the UE requests U-plane resources by the NAS service request message.

At step 960, BS A may instruct the UE to perform a handover to the frequency B. Alternatively, the BS A may configure the UE for dual-connectivity or carrier aggregation with the frequency B. The UE may perform the handover, dual-connectivity, or carrier aggregation as instructed by the BS A and in coordination with the BS A, the BS B, and/or the core network. For handover, the UE may switch to be served by the BS B over the frequency B. For dual-connectivity, the UE may continue to be served by the BS A over the frequency A and additionally served by the BS B over the frequency B. For carrier aggregation, the UE may continue to be served by the BS A over the frequency A and additionally served by the BS A over the frequency B.

After the UE is on the frequency B (e.g., in communication with the network via the frequency B) via the handover, the dual-connectivity, or the carrier aggregation, the UE may communicate the data in the PDU session over the slice B in the frequency B.

As can be observed from the method 900, the UE can establish and activate a PDU session for the slice B while the UE is on the frequency A (e.g., in communication with the BS A). The PDU session activation for the slice B is completed after the UE is on the frequency B. Further, the UE may have an ongoing PDU session on the slice A (e.g., for communicating eMBB data) when UE requests for a PDU session on slice B (e.g., for communicating URLLC data). Accordingly, the method 900 can provide the UE with on-demand URLLC services while the UE is on a frequency that does not provide the URLLC slices by including URLLC slices in allowed NSSAI based on availability of the URLLC slices in another frequency of the network.

In an example, the method 900 can be applied in a network deployment with a 2.6 GHz carrier (e.g., the frequency A) and a 4.9 GHz carrier (e.g., the frequency B), where the 2.6 GHz carrier is configured for eMBB slices (e.g., the network slices 250) serving eMBB services and voice services and the 4.9 GHz carrier is configured for URLLC slices serving URLLC services. In some examples, the 4.9 GHz carrier may also be configured for eMBB slices so that the 4.9 GHz carrier can provide concurrent URLLC services and eMBB services. In some examples, the 2.6 GHz carrier may be in a tracking area with a TAC 1 and the 4.9 GHz carrier may be in a tracking area with a TAC 2 different from the TAC 1. In other words, the 2.6 GHz carrier and the 4.9 GHz carrier may be serving different tracking areas.

While the method 900 is described in the context of the eMBB and URLLC services, where UE requests a URLLC service on-demand while in communication with an eMBB frequency and/or slice, the method 900 can be applied to any suitable types of services to provide on-demand service.

Figure 10:
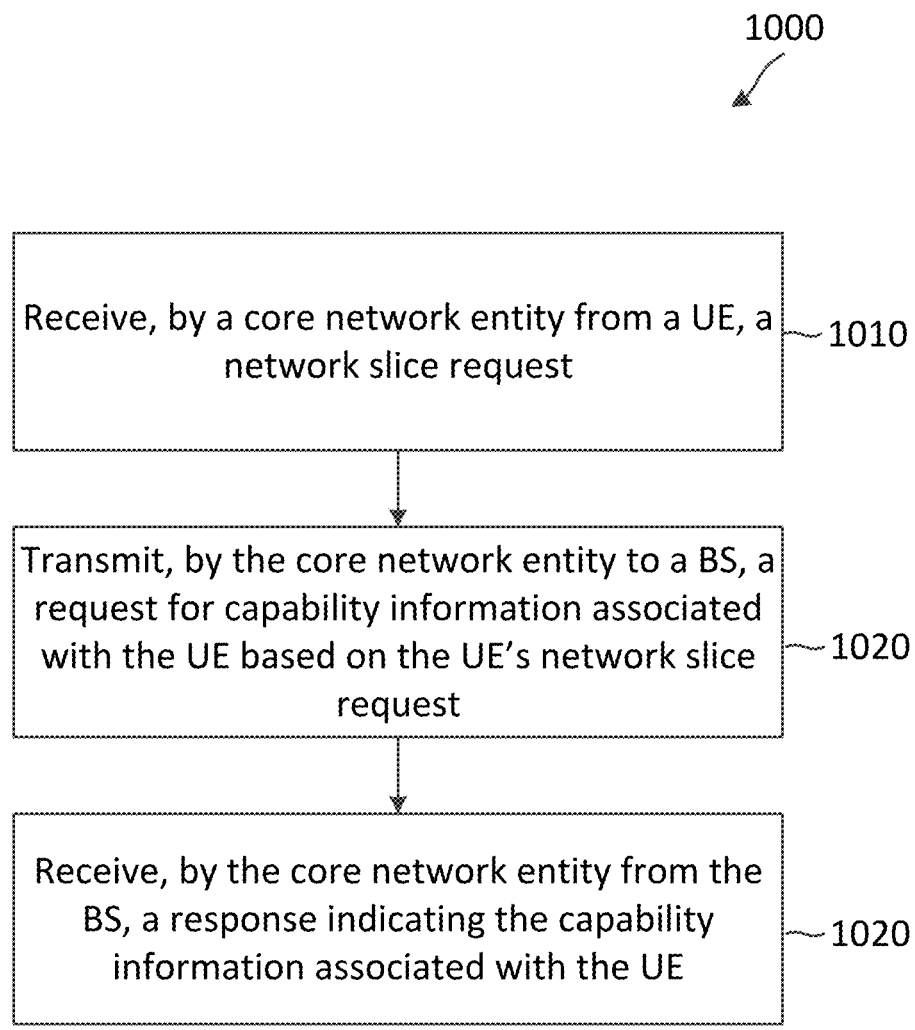
FIG. 10 is a flow diagram of a communication method according to some embodiments of the present disclosure.

FIG. 10 is a flow diagram of a communication method 1000 according to some embodiments of the present disclosure. Steps of the method 1000 can be executed by a computing device (e.g., a processor, processing circuit, and/or other suitable component) or other suitable means for performing the steps. For example, a core network entity, such as a core network 230 and/or the network unit 500, may utilize one or more components, such as the processor 502, the memory 504, the network slicing module 508, the transceiver 510, the modem 512, and the frontend 514, to execute the steps of method 1000. The method 1000 may employ similar mechanisms as discussed in the methods 300, 700, 800, and/or 900 described above with respect to FIGS. 3, 7, 8, and/or 9, respectively. As illustrated, the method 1000 includes a number of enumerated steps, but embodiments of the method 1000 may include additional steps before, after, and in between the enumerated steps. In some embodiments, one or more of the enumerated steps may be omitted or performed in a different order.

At step 1010, the method 1000 includes receiving, by a core network entity from a UE, a network slice request. In an example, the core network entity may receive the network slice request via a BS operating over the first cell frequency. In this example, the BS forwards the UE's network slice request to the core network entity. The UE may be associated with a first cell frequency (e.g., the frequency carrier 220) of a network (e.g., the networks 100 and/or 200), and the network slice request may indicate a request for a slice A and a slice B. The network may configure slice A over the first cell frequency and configure slice B over a second cell frequency of the network. In an example, the slice A is supported by the current tracking area, and the slice B is not supported by the current tracking area. The second cell frequency may be in a different TAC than the first frequency.

At step 1020, the method 1000 includes transmitting, by the core network entity to the BS, a request for capability information associated with the UE based on the UE's network slice request. In an example, the request is a NAS registration request message including requested-NSSAI indicating the slice A and the slice B. The core network entity may transmit the request for capability information in response to determining that a network slice requested by the UE is not supported by the current tracking area.

At step 1030, the method 1000 includes receiving, by the core network entity from the BS, a response indicating capability information associated with the UE. In an example, BS may compare the UE's radio capability and the network's capability, and determine matches between the UE's radio capability and the network's capability. For example, the BS may communicate with its neighboring cells and check the network slices supported by the neighboring cells and the frequencies of the requested NSSAI requested by the UE. In an example, the response is a NAS registration request response including available NSSAI indicating slices that are supported by the network. The available NSSAI may include allowed NSSAI (slices that are supported by the current tracking area) and slices that although not supported by the current tracking area, are supported on-demand by the UE. In this example, the NAS registration request response includes available NSSAI indicating slices A and B.

Figure 11:
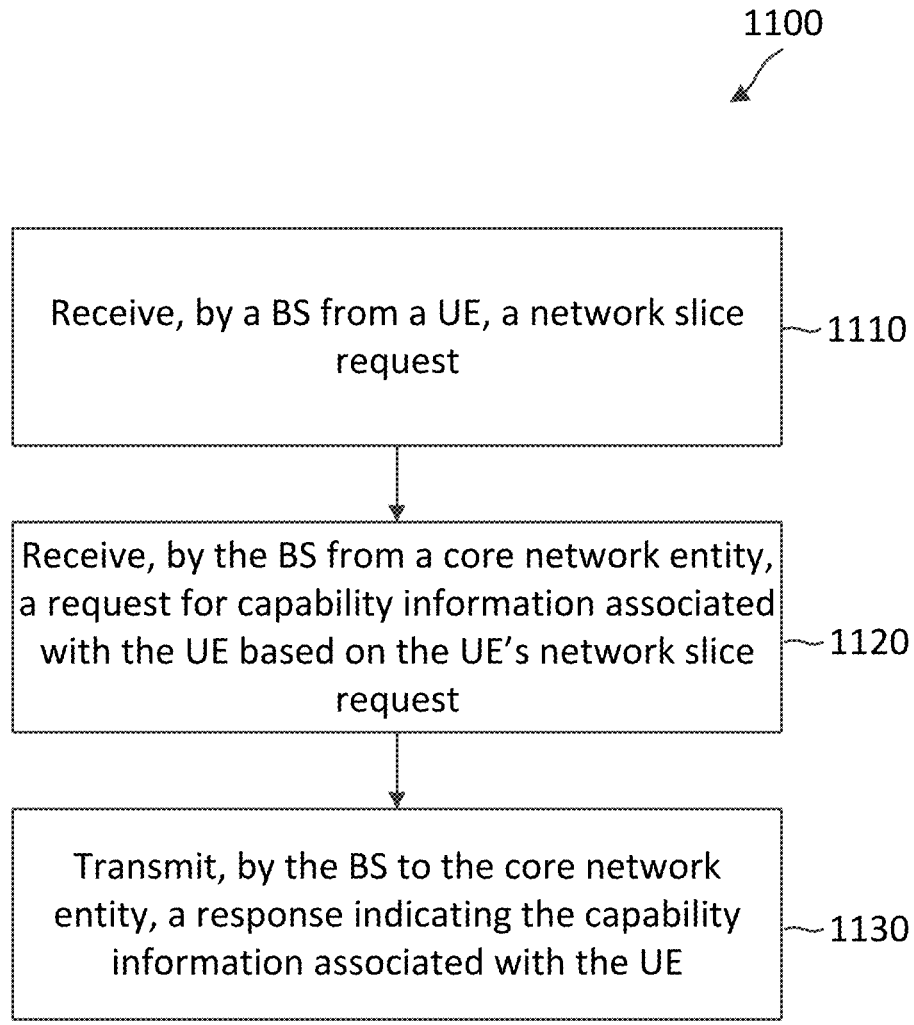
FIG. 11 is a flow diagram of a communication method according to some embodiments of the present disclosure.

FIG. 11 is a flow diagram of a communication method 1100 according to some embodiments of the present disclosure. Steps of the method 1100 can be executed by a computing device (e.g., a processor, processing circuit, and/or other suitable component) or other suitable means for performing the steps. For example, a network entity, such as the BS 105, 205, and/or 400, may utilize one or more components, such as the processor 402, the memory 404, the network slicing module 408, the transceiver 410, the modem 412, and the one or more antennas 416, to execute the steps of method 1100. The method 1100 may employ similar mechanisms as in the methods 300, 700, 800, and/or 900 described above with respect to FIGS. 3, 7, 8, and/or 9, respectively. As illustrated, the method 1100 includes a number of enumerated steps, but embodiments of the method 1100 may include additional steps before, after, and in between the enumerated steps. In some embodiments, one or more of the enumerated steps may be omitted or performed in a different order.

At step 1110, the method 1100 includes receiving, by a BS from a UE, a network slice request. In an example, the UE is associated with a BS operating in a first cell frequency (e.g., the frequency carrier 220). The network may configure a slice A over the first cell frequency and configure a slice B over a second cell frequency of the network. In an example, the slice A is supported by the current tracking area, and the slice B is not supported by the current tracking area. The second cell frequency may be in a different TAC than the first frequency.

At step 1120, the method 1100 includes receiving, by the BS from a core network entity, a request for capability information associated with the UE based on the UE's network slice request. In an example, the request may be a UE capability check request message that includes requested-NSSAI indicating the requested slices that are or are not supported by the current tracking area and/or TAI.

At step 1130, the method 1100 includes transmitting, by the BS from the core network entity, a response indicating the capability information associated with the UE.

Figure 12:
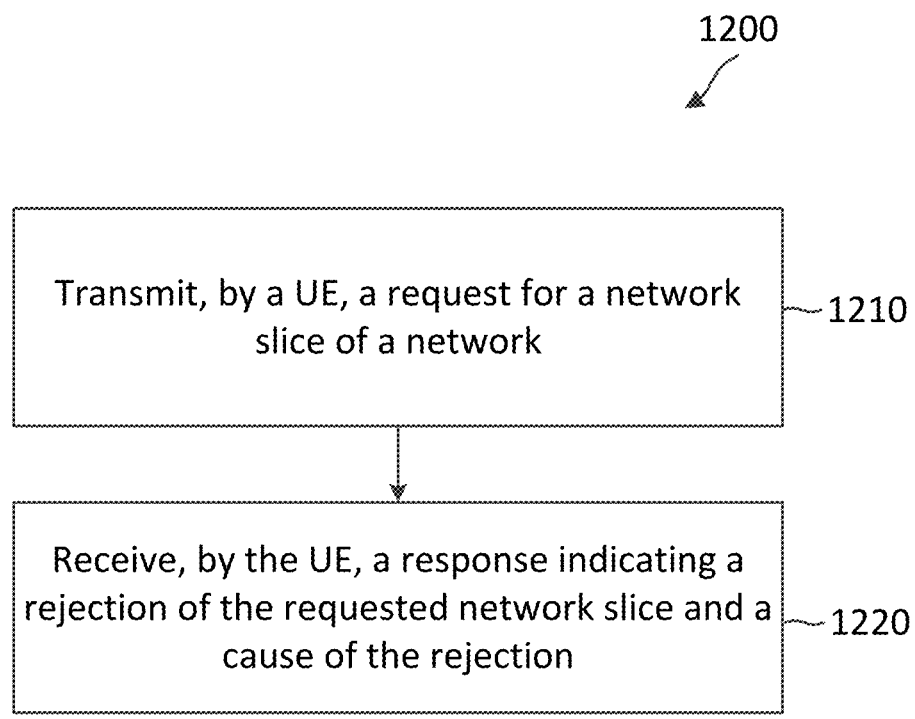
FIG. 12 is a flow diagram of a communication method according to some embodiments of the present disclosure.

FIG. 12 is a flow diagram of a communication method 1200 according to some embodiments of the present disclosure. Steps of the method 1200 can be executed by a computing device (e.g., a processor, processing circuit, and/or other suitable component) of a wireless communication device or other suitable means for performing the steps. For example, a wireless communication device, such as the UE 115, UE 215, and/or UE 600, may utilize one or more components, such as the processor 602, the memory 604, the network slicing module 608, the transceiver 610, the modem 612, and the one or more antennas 616, to execute the steps of method 1200. The method 1200 may employ similar mechanisms as in the methods 300, 700, 800, and/or 900 described above with respect to FIGS. 3, 7, 8, and/or 9, respectively. As illustrated, the method 1200 includes a number of enumerated steps, but embodiments of the method 1200 may include additional steps before, after, and in between the enumerated steps. In some embodiments, one or more of the enumerated steps may be omitted or performed in a different order.

At step 1210, the method 1200 includes transmitting, by a UE, a request for a network slice of a network. In an example, the request is a network registration request message indicating at least one network slice that is not supported by the current tracking area. The UE may be associated with a first cell frequency (e.g., the frequency carrier 220) of a network (e.g., the networks 100 and/or 200), and the network slice request may indicate a request for a slice A and a slice B. The network may configure slice A over the first cell frequency and configure slice B over a second cell frequency of the network. In an example, the slice A is supported by the current tracking area, and the slice B is not supported by the current tracking area. The second cell frequency may be in a different TAC than the first frequency.

At step 1220, the method 1200 includes receiving, by the UE, a response indicating a rejection of the requested network slice and a cause of the rejection. In an example, the response is a network registration response, and a cause value indicates that the rejection is due to the requested network slice not being available in the current tracking area, but can be supported by NG-RAN controlled mobility on-demand.

Figure 13:
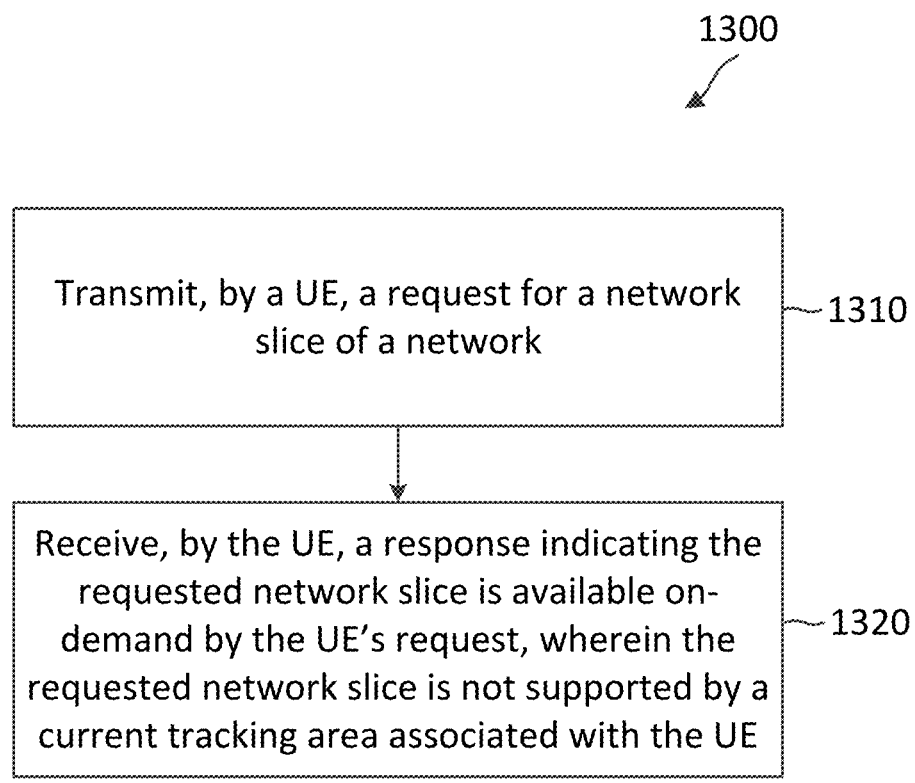
FIG. 13 is a flow diagram of a communication method according to some embodiments of the present disclosure.

FIG. 13 is a flow diagram of a communication method 1300 according to some embodiments of the present disclosure. Steps of the method 1300 can be executed by a computing device (e.g., a processor, processing circuit, and/or other suitable component) of a wireless communication device or other suitable means for performing the steps. For example, a wireless communication device, such as the UE 115, UE 215, and/or UE 600, may utilize one or more components, such as the processor 602, the memory 604, the network slicing module 608, the transceiver 610, the modem 612, and the one or more antennas 616, to execute the steps of method 1300. The method 1300 may employ similar mechanisms as in the methods 300, 700, 800, and/or 900 described above with respect to FIGS. 3, 7, 8, and/or 9, respectively. As illustrated, the method 1300 includes a number of enumerated steps, but embodiments of the method 1300 may include additional steps before, after, and in between the enumerated steps. In some embodiments, one or more of the enumerated steps may be omitted or performed in a different order.

At step 1310, the method 1300 includes transmitting, by a UE, a request for a network slice of a network. In an example, the request is a network registration request message indicating at least one network slice that is not supported by the current tracking area. The UE may be associated with a first cell frequency (e.g., the frequency carrier 220) of a network (e.g., the networks 100 and/or 200), and the network slice request may indicate a request for a slice A and a slice B. The network may configure slice A over the first cell frequency and configure slice B over a second cell frequency of the network. In an example, the slice A is supported by the current tracking area, and the slice B is not supported by the current tracking area. The second cell frequency may be in a different TAC than the first frequency.

At step 1320, the method 1300 includes receiving, by the UE, a response indicating the requested network slice is available on-demand by the UE's request, where the requested network slice is not supported by a current tracking area associated with the UE. In an example, the response is a network registration response and includes a cause-value indicating that a rejection is due to the requested network slice not being available in the current tracking area.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
receiving, by a core network entity from a user equipment (UE), a network slice request;
transmitting, by the core network entity to a first base station (BS), a request for capability information associated with the UE based on the UE's network slice request; and
receiving, by the core network entity from the first BS, a response indicating the capability information associated with the UE.

2. The method of claim 1, wherein receiving the network slice request includes:
receiving, by the core network entity, a network registration request message including requested network slice selection assistance information (NSSAI) indicating a first set of network slices and a second set of network slices requested by the UE, the first set of network slices being supported by a current tracking area associated with the first BS, and the second set of network slices not being supported by the current tracking area.

3. The method of claim 1, further comprising:
determining whether a first network slice indicated in the network slice request is supported by a current tracking area associated with the first BS, wherein transmitting the request includes transmitting the request in response to a determination that the first network slice is not supported by the current tracking area.

4. The method of claim 1, wherein transmitting the request includes:
transmitting, by the core network entity, a UE capability check request message including requested NSSAI indicating a second set of network slices, the second set of network slices not being supported by a current tracking area associated with the first BS.

5. The method of claim 4, wherein receiving the response includes:
receiving, by the core network entity, a UE capability check response message including available NSSAI indicating a third set of network slices supported by a second BS operating in a different carrier frequency than the first BS, wherein the third set of network slices is a subset of the second set of network slices.

6. The method of claim 1, further comprising:
determining, by the core network entity, that a first network slice indicated in the network slice request is available on-demand by the UE, wherein the first network slice is not supported by a current tracking area associated with the first BS; and
transmitting a registration response in response to the network slice request, the registration response including a rejection of the first network slice and a cause of the rejection.

7. The method of claim 6, wherein the network slice request indicates a second network slice that is supported by the current tracking area, and the response further includes allowed NSSAI indicating the second network slice.

8. The method of claim 1, further comprising:
determining, by the core network entity, that a first network slice indicated in the network slice request is available on-demand by the UE, wherein the first network slice is not supported by a current tracking area associated with the first BS; and
transmitting a registration response in response to the network slice request, the registration response including an indication that the first network slice is available on-demand by the UE.

9. The method of claim 1, wherein the network slice request indicates a second network slice that is supported by a current tracking area associated with the first BS, and the response further includes allowed NSSAI indicating the second network slice.

10. The method of claim 1, wherein the network slice request indicates a first network slice that is not supported by a current tracking area associated with the first BS, and the first BS operates over a first cell frequency, the method further comprising:
receiving, by the core network entity from the UE, a protocol data unit (PDU) session establishment request message requesting PDU session establishment over the first network slice;
transmitting, by the core network entity to the first BS, a PDU session resource setup request message to the first BS that causes the first BS to setup resources for the first network slice; and
receiving, by the core network entity from the first BS, a PDU session resource setup response message indicating a failure status based on the first network slice not provided by the first cell frequency.

11. The method of claim 10, further comprising:
transmitting, by the core network entity to the UE, a PDU session establishment response message indicating that a PDU session established for the first network slice is in an inactive mode and indicating a PDU session ID for the established PDU session; and
receiving, by the core network entity from the UE, a service request message indicating the PDU session ID for the first network slice.

12. A method of wireless communication, comprising:
transmitting, by a user equipment (UE), a request for a network slice of a network;
transmitting, by the UE, a network registration request message including requested network slice selection assistance information (NSSAI) indicating a first set of network slices and a second set of network slices requested by the UE, the first set of network slices being supported by a current tracking area associated with a base station (BS), and the second set of network slices not being supported by the current tracking area; and
receiving, by the UE, a response indicating a rejection of the requested network slice and a cause of the rejection.

13. The method of claim 12, wherein the UE is associated with a BS operating in a first frequency cell.

14. The method of claim 12, wherein the cause of the rejection is indicated by a cause value indicating that the rejection is due to the requested network slice not being available in a current tracking area associated with the UE, but can be supported by next generation (NG)-radio access network (RAN) controlled mobility on-demand.

15. The method of claim 12, wherein the request for the network slice indicates a first network slice that is not supported by a current tracking area associated with a BS, and the BS operates over a first cell frequency, the method further comprising:

transmitting, by the UE to a core network entity via the BS, a protocol data unit (PDU) session establishment request message indicating the first network slice; and receiving, by the UE from the core network entity via the BS, a PDU session establishment response message indicating that a PDU session established for the first network slice is in an inactive mode and indicating a PDU session ID for the established PDU session.

16. The method of claim 15, further comprising:
transmitting, by the UE to the core network entity via the BS, a service request message indicating the PDU session ID for the first network slice.

17. A method of wireless communication, comprising:
transmitting, by a user equipment (UE), a request for a network slice of a network; and
receiving, by the UE, a response indicating the requested network slice is available on-demand by the UE's request, wherein the requested network slice is not supported by a current tracking area associated with the UE, wherein the response includes a cause-value indicating that a rejection is due to the requested network slice not being available in the current tracking area.

18. An apparatus, comprising:
a transceiver configured to:
receive, from a user equipment (UE), a network slice request;
transmit, to a first base station (BS), a request for capability information associated with the UE based on the UE's network slice request; and
receive, from the first BS, a response indicating the capability information associated with the UE.

19. The apparatus of claim 18, wherein the transceiver is configured to:
receive a network registration request message including requested network slice selection assistance information (NSSAI) indicating a first set of network slices and a second set of network slices requested by the UE, the first set of network slices being supported by a current tracking area associated with the first BS, and the second set of network slices not being supported by the current tracking area.

20. The apparatus of claim 18, further comprising:
a processor configured to determine whether a first network slice indicated in the network slice request is supported by a current tracking area associated with the first BS, wherein the transceiver transmits the request for capability information in response to a determination that the first network slice is not supported by the current tracking area.

21. The apparatus of claim 18, wherein the transceiver is configured to:
transmit a UE capability check request message including requested NSSAI indicating a second set of network slices, wherein the second set of network slices is not supported by a current tracking area associated with the first BS.

22. The apparatus of claim 21, wherein the transceiver is configured to:
receive a UE capability check response message including available NSSAI indicating a third set of network slices supported by a second BS operating in a different carrier frequency than the first BS, wherein the third set of network slices is a subset of the second set of network slices.

23. The apparatus of claim 18, further comprising:
a processor configured to determine that a first network slice indicated in the network slice request is available on-demand by the UE, wherein the first network slice is not supported by a current tracking area associated with the first BS; and
wherein the transceiver is configured to transmit a registration response in response to the network slice request, and wherein the registration response includes a rejection of the first network slice and a cause of the rejection.

24. The apparatus of claim 23, wherein the network slice request indicates a second network slice that is supported by the current tracking area, and the response further includes allowed NSSAI indicating the second network slice.

25. The apparatus of claim 18, further comprising:
a processor configured to determine that a first network slice indicated in the network slice request is available on-demand by the UE, wherein the first network slice is not supported by a current tracking area associated with the first BS; and
wherein the transceiver is configured to transmit a registration response in response to the network slice request, wherein the registration response includes an indication that the first network slice is available on-demand by the UE.

26. The apparatus of claim 18, wherein the network slice request indicates a second network slice that is supported by a current tracking area associated with the first BS, and the response further includes allowed NSSAI indicating the second network slice.

27. The apparatus of claim 18, wherein the network slice request indicates a first network slice that is not supported by a current tracking area associated with the first BS, and the first BS operates over a first cell frequency, wherein the transceiver is configured to:
receive, from the UE, a protocol data unit (PDU) session establishment request message requesting PDU session establishment over the first network slice;
transmit, to the first BS, a PDU session resource setup request message to the first BS that causes the first BS to setup resources for the first network slice; and
receive, from the first BS, a PDU session resource setup response message indicating a failure status based on the first network slice not provided by the first cell frequency.

28. The apparatus of claim 27, wherein the transceiver is configured to:
transmit, to the UE, a PDU session establishment response message indicating that a PDU session established for the first network slice is in an inactive mode and indicating a PDU session ID for the established PDU session; and
receive, from the UE, a service request message indicating the PDU session ID for the first network slice.

* * * * *